(12) United States Patent
Kobayashi et al.

(10) Patent No.: US 11,938,971 B2
(45) Date of Patent: Mar. 26, 2024

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventors: Hiromitsu Kobayashi, Nisshin (JP); Taizo Masuda, Yokohama (JP); Yuta Kataoka, Susono (JP); Miki Nomoto, Nisshin (JP); Yoshiki Ueda, Susono (JP); Satoshi Omi, Ebina (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/573,757

(22) Filed: Jan. 12, 2022

(65) Prior Publication Data

US 2022/0281487 A1 Sep. 8, 2022

(30) Foreign Application Priority Data

Mar. 4, 2021 (JP) ................................ 2021-034590

(51) Int. Cl.
*B60W 60/00* (2020.01)
*G06V 20/58* (2022.01)
(Continued)

(52) U.S. Cl.
CPC ....... *B60W 60/00253* (2020.02); *G06V 20/58* (2022.01); *G06V 40/174* (2022.01);
(Continued)

(58) Field of Classification Search
CPC ...... B60W 10/18; B60W 10/20; B60W 30/06; B60W 40/02; B60W 2040/0881;
(Continued)

(56) References Cited

U.S. PATENT DOCUMENTS

| | | | |
|---|---|---|---|
| 11,710,352 B1 * | 7/2023 | Ulutan | G06V 10/764 |
| | | | 382/103 |
| 2017/0297587 A1 | 10/2017 | Mimura et al. | |

(Continued)

FOREIGN PATENT DOCUMENTS

| | | | |
|---|---|---|---|
| DE | 102018218671 | * | 4/2020 |
| JP | 2017-121865 A | | 7/2017 |

(Continued)

OTHER PUBLICATIONS

English translation of foreign document DE 102018218671 (Year: 2020).*

*Primary Examiner* — Russell Frejd
*Assistant Examiner* — Brandon Z Willis
(74) *Attorney, Agent, or Firm* — Dinsmore & Shohl LLP

(57) ABSTRACT

In a vehicle control device for an autonomous driving vehicle that autonomously travels based on an operation command, a gesture image of a person around the autonomous driving vehicle is acquired, and a stored reference gesture image is collated with the acquired gesture image. At this time, when it is discriminated that the gesture of the person around the autonomous driving vehicle is a gesture requesting the autonomous driving vehicle to stop, it is determined whether a disaster has occurred. When it is determined that the disaster has occurred, the autonomous driving vehicle is caused to stop around the person requesting the autonomous driving vehicle to stop.

13 Claims, 17 Drawing Sheets

(51) Int. Cl.
*G06V 40/16* (2022.01)
*G06V 40/20* (2022.01)

(52) U.S. Cl.
CPC ....... *G06V 40/28* (2022.01); *B60W 2420/403* (2013.01); *B60W 2520/04* (2013.01); *B60W 2540/041* (2020.02); *B60W 2540/049* (2020.02); *B60W 2540/21* (2020.02); *B60W 2540/215* (2020.02); *B60W 2554/4029* (2020.02); *B60W 2555/20* (2020.02); *B60W 2556/10* (2020.02)

(58) Field of Classification Search
CPC ............... B60W 50/10; B60W 60/001; B60W 60/0024; B60W 60/0017; B60W 60/00253; B60W 2420/42; B60W 2520/04; B60W 2540/041; B60W 2540/049; B60W 2540/045; B60W 2540/21; B60W 2540/215; B60W 2540/223; B60W 2554/4029; B60W 2554/4046; B60W 2555/20; B60W 2556/10; B60W 2710/18; G06V 10/40; G06V 10/82; G06V 20/56; G06V 20/58; G06V 20/593; G06V 40/10; G06V 40/174; G06V 40/16; G06V 40/113; G06V 40/11; G06V 40/107; G06V 40/20; G06V 40/28

See application file for complete search history.

(56) References Cited

U.S. PATENT DOCUMENTS

| | | | | |
|---|---|---|---|---|
| 2019/0171215 A1* | 6/2019 | Tatourian | ............. | G05D 1/0246 |
| 2019/0212738 A1* | 7/2019 | Umetani | ................ | B60Q 1/507 |
| 2020/0272143 A1* | 8/2020 | Scott | ............... | B60W 60/00253 |
| 2021/0097315 A1* | 4/2021 | Carruthers | ....... | G08B 13/19645 |
| 2021/0237778 A1* | 8/2021 | Kuranuki | ............... | B60N 2/002 |
| 2022/0332349 A1* | 10/2022 | Benou | ........................ | G06T 7/73 |
| 2022/0358766 A1* | 11/2022 | Yamazaki | ............. | G08B 25/00 |

FOREIGN PATENT DOCUMENTS

| | | |
|---|---|---|
| JP | 2017-191562 A | 10/2017 |
| JP | 2018-180987 A | 11/2018 |
| JP | 2019-016150 A | 1/2019 |
| JP | 2020-098570 A | 6/2020 |

\* cited by examiner

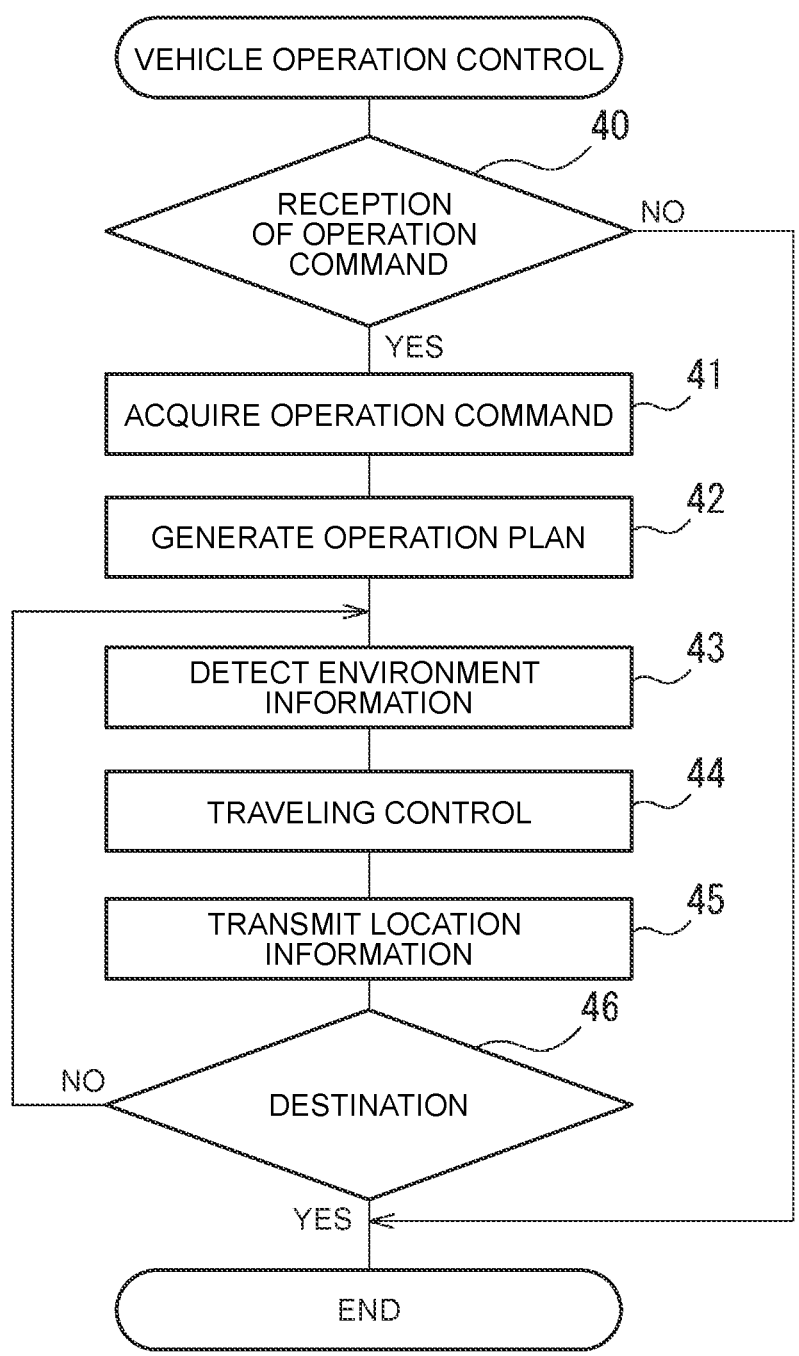

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2021-034590 filed on Mar. 4, 2021, incorporated herein by reference in its entirety.

BACKGROUND

1. Technical Field

The present disclosure relates to a vehicle control device, a vehicle control method, and a storage medium.

2. Description of Related Art

There is known a control device for an autonomous driving vehicle that enables a user of the vehicle who is outside the vehicle to stop the moving autonomous driving vehicle by gesture when the autonomous driving vehicle is parked in a parking space by remote operation or when the autonomous driving vehicle is moved out from a parking space by remote operation (see, for example, Japanese Unexamined Patent Application Publication No. 2017-121865 (JP 2017-121865 A)). In this case, the gesture requesting the autonomous driving vehicle to stop is predetermined, and when the gesture of the user of the vehicle is recognized as the predetermined gesture, the autonomous driving vehicle is stopped.

SUMMARY

For example, when an autonomous driving vehicle is autonomously traveling based on an operation command and some kind of disaster occurs, it is conceivable to use this autonomous driving vehicle for rescuing a victim. In this case, the victim may not be able to request for help from the autonomous driving vehicle through the network due to reasons such as lack of communication or lack of power supply. In some embodiments, in such a case, when the autonomous driving vehicle that is autonomously traveling based on the operation command is traveling nearby, the victim can stop the autonomous driving vehicle by gesture to get on the autonomous driving vehicle.

However, if a system that can stop an autonomous driving vehicle by gesture is constructed, there is an issue that the autonomous driving vehicle will be frequently stopped between pre-installed stops even in normal times regardless of the occurrence of a disaster, and thus the autonomous driving vehicle cannot operate normally according to a preset time schedule in normal times.

Therefore, the present disclosure provides a vehicle control device for an autonomous driving vehicle that autonomously travels based on an operation command. The vehicle control device includes: a reference data storage unit that stores in advance data related to a reference gesture image of a person when requesting the autonomous driving vehicle to stop; a recognition unit that recognizes that there is a person around the autonomous driving vehicle during autonomous traveling of the autonomous driving vehicle; a traveling data storage unit that stores data related to a gesture image of the person around the autonomous driving vehicle, when the recognition unit recognizes that there is the person around the autonomous driving vehicle; a discrimination unit that discriminates whether a gesture of the person around the autonomous driving vehicle is a gesture requesting the autonomous driving vehicle to stop, by performing collation of the data related to the reference gesture image stored in the reference data storage unit with the data related to the gesture image stored in the traveling data storage unit; and a disaster occurrence determination unit that determines whether a disaster related to a traveling area of the autonomous driving vehicle has occurred. When the discrimination unit discriminates that the gesture of the person around the autonomous driving vehicle is the gesture requesting the autonomous driving vehicle to stop, and the disaster occurrence determination unit determines that the disaster has occurred, the autonomous driving vehicle is caused to stop around the person requesting the autonomous driving vehicle to stop. Further, the present disclosure provides a vehicle control device for an autonomous driving vehicle that autonomously travels based on an operation command. The vehicle control device includes: a reference data storage unit that stores in advance data related to a reference gesture image of a person when requesting the autonomous driving vehicle to stop and data related to reference words when requesting the autonomous driving vehicle to stop; a disaster occurrence determination unit that determines whether a disaster related to a traveling area of the autonomous driving vehicle has occurred; a recognition unit that recognizes that there is a person around the autonomous driving vehicle during autonomous traveling of the autonomous driving vehicle, when the disaster occurrence determination unit determines that a disaster has occurred; a traveling data storage unit that stores data related to a gesture image of the person around the autonomous driving vehicle and data related to words of the person around the autonomous driving vehicle, when the disaster occurrence determination unit determines that a disaster has occurred and the recognition unit recognizes that there is the person around the autonomous driving vehicle; and a discrimination unit that discriminates, when the disaster occurrence determination unit determines that the disaster has occurred, whether a gesture of the person around the autonomous driving vehicle is a gesture requesting the autonomous driving vehicle to stop or whether the words of the person around the autonomous driving vehicle are words requesting the autonomous driving vehicle to stop, by performing at least one of collation of the data related to the reference gesture image stored in the reference data storage unit with the data related to the gesture image stored in the traveling data storage unit and collation of the data related to the reference words stored in the reference data storage unit with the data related to the words stored in the traveling data storage unit. When the discrimination unit discriminates that the gesture of the person around the autonomous driving vehicle is the gesture requesting the autonomous driving vehicle to stop, or that the words of the person around the autonomous driving vehicle are the words requesting the autonomous driving vehicle to stop, the autonomous driving vehicle is caused to stop around the person requesting the autonomous driving vehicle to stop. Further, the present disclosure provides a vehicle control method for an autonomous driving vehicle that autonomously travels based on an operation command. The vehicle control method includes: storing in advance data related to a reference gesture image of a person when requesting the autonomous driving vehicle to stop; storing data related to a gesture image of a person around the autonomous driving vehicle, when an existence of the person around the autonomous driving vehicle is recognized during autonomous traveling of the autonomous driving vehicle; discriminating whether a gesture of the person around the autonomous driving vehicle is a gesture requesting the autonomous driving vehicle to stop, by performing collation of the stored data related to the reference gesture image with the stored data related to the gesture image; determining whether a disaster related to a traveling area of the autonomous driving vehicle has occurred; and causing the autonomous driving vehicle to stop around the person requesting the autonomous driving vehicle to stop, when it is discriminated that the gesture of the person around the autonomous driving vehicle is the gesture requesting the autonomous driving vehicle to stop, and it is determined that the disaster has occurred. Further, the present disclosure provides a storage medium storing a program that causes a computer to: control an autonomous driving vehicle that autonomously travels based on an operation command; store in advance data related to a reference gesture image of a person when requesting the autonomous driving vehicle to stop; store data related to a gesture image of a person around the autonomous driving vehicle, when an existence of the person around the autonomous driving vehicle is recognized during autonomous traveling of the autonomous driving vehicle; discriminate whether a gesture of the person around the autonomous driving vehicle is a gesture requesting the autonomous driving vehicle to stop, by performing collation of the stored data related to the reference gesture image with the stored data related to the gesture image; determine whether a disaster related to a traveling area of the autonomous driving vehicle has occurred; and cause the autonomous driving vehicle to stop around the person requesting the autonomous driving vehicle to stop, when it is discriminated that the gesture of the person around the autonomous driving vehicle is the gesture requesting the autonomous driving vehicle to stop, and it is determined that the disaster has occurred.

In the first, third, and fourth disclosures, the autonomous driving vehicle can be stopped by gesture only in the event of a disaster, whereby the autonomous driving vehicle can operate normally according to a preset time schedule in normal times. In the second disclosure, in addition to the effect of the first disclosure, it is possible to stop the autonomous driving vehicle by words.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart for controlling an operation of the vehicle;

DETAILED DESCRIPTION OF EMBODIMENTS

Figure 1:
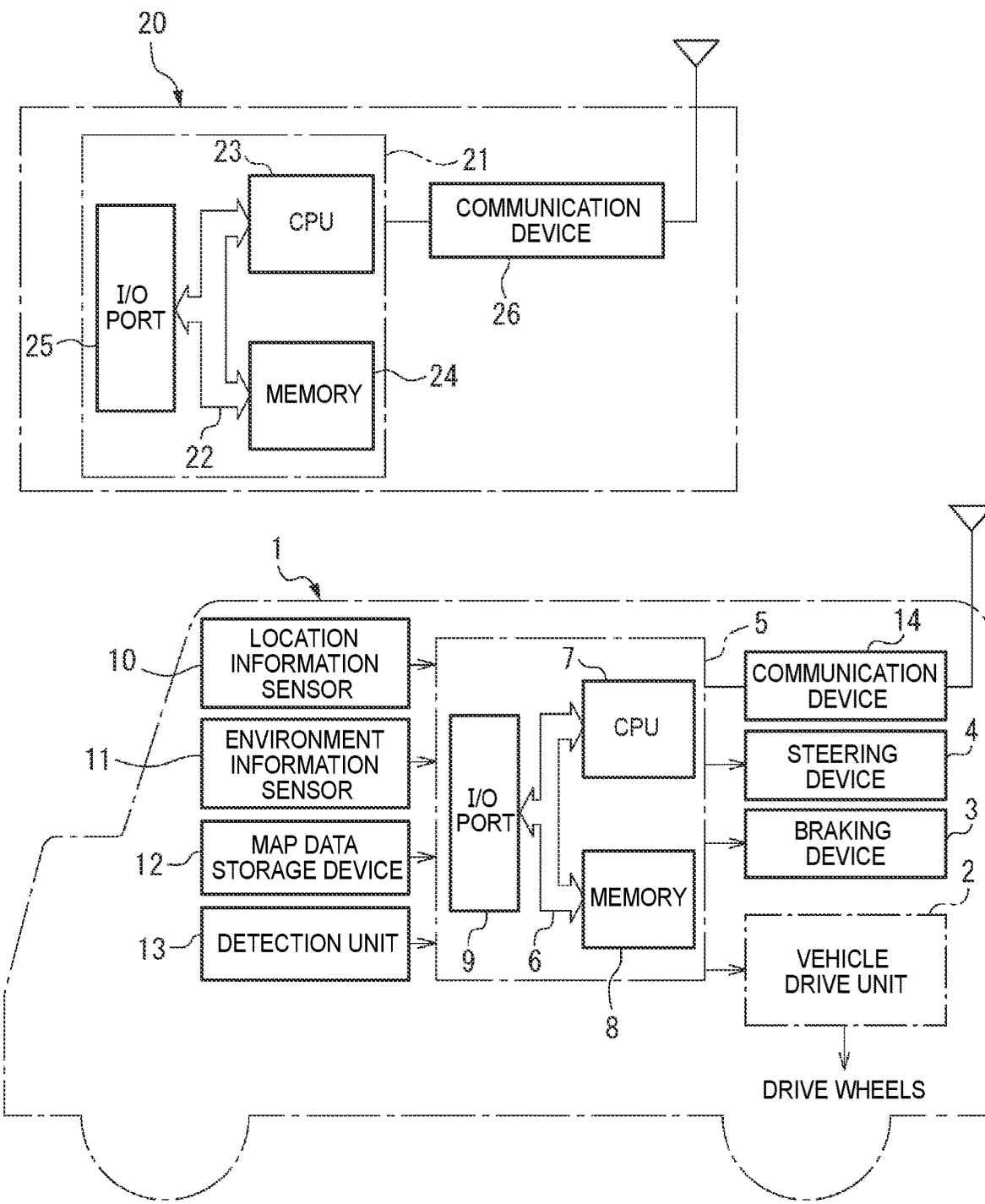
FIG. 1 is a diagram graphically illustrating a vehicle and a server.

With reference to FIG. 1, the numeral 1 illustrates a vehicle graphically. In an embodiment according to the present disclosure, a vehicle 1 is a circulation bus that can be caused to autonomously travel along a preset traveling route within a preset region. In FIG. 1, the numeral 2 indicates a vehicle drive unit for applying a driving force to drive wheels of the vehicle 1, the numeral 3 indicates a braking device for braking the vehicle 1, the numeral 4 indicates a steering device for steering the vehicle 1, and the numeral 5 indicates an electronic control unit mounted in the vehicle 1. As shown in FIG. 1, the electronic control unit 5 is composed of a digital computer, and includes a central processing unit (CPU: microprocessor) 7, a memory 8 composed of a read-only memory (ROM) and a random access memory (RAM), and an input/output port 9 that are connected to each other by a bidirectional bus 6.

Further, as shown in FIG. 1, the vehicle 1 is provided with a location information sensor 10, an environment information sensor 11, a map data storage device 12, and a detection unit 13. The location information sensor 10 is a sensor for detecting the current location of the vehicle 1. The location information sensor 10 is composed of, for example, a global positioning system (GPS) that receives a radio wave from an artificial satellite and detects the current location of the vehicle 1. Further, the environment information sensor 11 includes a sensor that detects the state of the vehicle 1 and a sensor that detects the periphery of the vehicle 1 to cause the vehicle 1 to autonomously travel. In this case, an acceleration sensor, a speed sensor, and an azimuth angle sensor are used as the sensor that detects the state of the vehicle 1, and a camera for capturing images of the front of the vehicle 1 or the like, light detection and ranging (LIDAR), a radar, or the like are used as the sensor that detects the periphery of the vehicle 1. Further, in the embodiment according to the present disclosure, as a sensor for detecting the periphery of the vehicle 1, a sound collector for capturing words spoken by a person in the vicinity of the vehicle 1 is used.

The map data storage device 12 stores map data and the like necessary for causing the vehicle 1 to autonomously travel, and the detection unit 13 includes, for example, various sensors for detecting an operation of the passengers getting on and off the circulation bus. The location information sensor 10, the environment information sensor 11, the map data storage device 12, and the detection unit 13 are connected to the electronic control unit 5.

Further, in FIG. 1, the numeral 20 indicates a server. As shown in FIG. 1, an electronic control unit 21 is installed in the server 20. The electronic control unit 21 is composed of a digital computer, and includes a CPU (microprocessor) 23, a memory 24 composed of a ROM and a RAM, and an input/output port 25 that are connected to each other by a bidirectional bus 22. A communication device 26 for communicating with the vehicle 1 is also installed in the server 20. The vehicle 1 is equipped with a communication device 14 for communicating with the server 20.

In the embodiment according to the present disclosure, the vehicle drive unit 2 is composed of an electric motor driven by a secondary battery or an electric motor driven by a fuel cell. Driving of the drive wheels is controlled by the electric motor described above in accordance with an output signal from the electronic control unit 5. Further, the braking control of the vehicle 1 is executed by the braking device 3 in accordance with the output signal from the electronic control unit 5. The steering control of the vehicle 1 is executed by the steering device 4 in accordance with the output signal from the electronic control unit 5.

Figure 2:
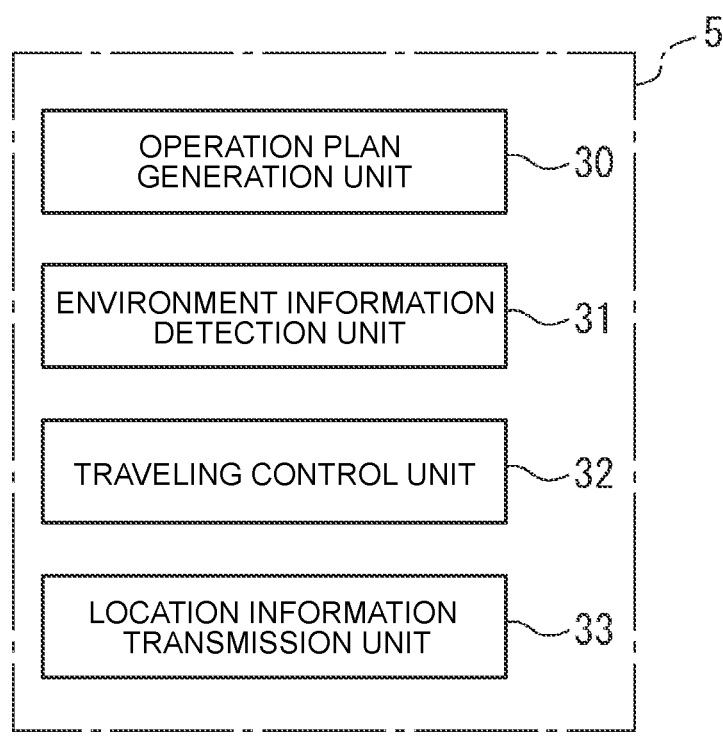
FIG. 2 is a functional configuration diagram for causing the vehicle to autonomously travel.

FIG. 2 shows a functional configuration diagram for causing the vehicle 1 to autonomously travel. As shown in FIG. 2, in the embodiment according to the present disclosure, the vehicle 1 includes an operation plan generation unit 30, an environment information detection unit 31, a traveling control unit 32, and a location information transmission unit 33. When the operation plan generation unit 30 receives an operation command from the server 20, the operation plan generation unit 30 generates an operation plan such as a traveling route, a traveling speed, and a stop position of the vehicle 1 based on the operation command. In the environment information detection unit 31, the environment information sensor 11 detects the environmental information necessary for the autonomous traveling of the vehicle 1. For example, in the environment information detection unit 31, the number and positions of lanes, the number and positions of other moving objects present around the vehicle 1, the number and positions of obstacles (for example, pedestrians, bicycles, structures, buildings, etc.) present around the vehicle 1, the structure of the roads, and road signs are detected.

The traveling control unit 32 executes the traveling control for causing the vehicle 1 to autonomously travel based on the operation plan generated by the operation plan generation unit 30, the environment information detected by the environment information detection unit 31, the map data stored in the map data storage device 12, and the current location of the vehicle 1 detected by the location information sensor 10. With this configuration, the vehicle 1 can be caused to autonomously travel along the set traveling route while avoiding contact with other moving objects and obstacles. The location information transmission unit 33 transmits information related to the current location of the vehicle 1 detected by the location information sensor 10 to the server 20 via the communication device 14. Note that, the operation plan generation unit 30, the environment information detection unit 31, the traveling control unit 32, and the location information transmission unit 33 are provided in the electronic control unit 5 of the vehicle 1.

FIG. 3 shows a vehicle operation control routine executed by the electronic control unit 5 mounted on the vehicle 1 to cause the vehicle 1 to autonomously travel. This routine is executed by interrupts at regular intervals. With reference to FIG. 3, first, in step 40, the electronic control unit 5 discriminates whether an operation command has been received from the server 20. When the electronic control unit 5 discriminates that the operation command has not been received from the server 20, the processing cycle is terminated. On the other hand, when the electronic control unit 5 discriminates that the operation command has been received from the server 20, the process proceeds to step 41 and the operation command is acquired. Next, in step 42, the operation plan such as the traveling route, the traveling speed, and the stop position of the vehicle 1 is generated based on the operation command.

Next, in step 43, the environment information necessary for autonomous traveling of the vehicle 1 is detected. Next, in step 44, the traveling control for causing the vehicle 1 to autonomously travel is executed, whereby the vehicle 1 can be caused to autonomously travel along the set traveling route while avoiding contact with other moving objects and obstacles. Then, in step 45, information related to the current location of the vehicle 1 is transmitted to the server 20. Next, in step 46, the electronic control unit 5 discriminates whether the vehicle 1 has arrived at the destination set by the operation command. In this case, in the embodiment according to the present disclosure, the electronic control unit 5 discriminates whether the circulation bus has arrived at the set destination after circulating a set number of times. In the case where the electronic control unit 5 discriminates that the vehicle 1 has not reached the destination, that is, in the embodiment of the present disclosure, when the electronic control unit 5 discriminates that the circulation bus has not arrived at the destination after circulating the set number of times, the process returns to step 43, and the autonomous traveling control of the vehicle 1 is continued. In the case where the electronic control unit 5 discriminates that the vehicle 1 has reached the destination, that is, in the embodiment of the present disclosure, when the electronic control unit 5 discriminates that the circulation bus has arrived at the destination after circulating the set number of times, the processing cycle is terminated.

In the embodiment according to the present disclosure, the vehicle 1 is a circulation bus that can be caused to autonomously travel along a preset traveling route within a preset region. The circulation bus that can be caused to autonomously travel in this way can be used as a rescue vehicle for victims to evacuate in the event of a disaster. However, in this case, the victim may not be able to request for help from the circulation bus through the network due to reasons such as lack of communication or lack of power supply. In some embodiments, in such a case, when the circulation bus that is autonomously traveling based on the operation command is traveling nearby, the victim can stop the circulation bus by gesture to get on the circulation bus.

An autonomous driving vehicle such as this circulation bus is equipped with various sensors capable of detecting the surrounding situation, and thus gestures can be detected by using these sensors. Therefore, in the embodiment according to the present disclosure, these sensors are used to detect a gesture, and when it is discriminated that the gesture is a gesture requesting the autonomous driving vehicle to stop, the autonomous driving vehicle is stopped.

However, if a system that can stop an autonomous driving vehicle by gesture is constructed, there is an issue that the autonomous driving vehicle will be frequently stopped between pre-installed stops even in normal times regardless of the occurrence of a disaster, and thus the autonomous driving vehicle cannot operate normally according to a preset time schedule in normal times. Therefore, in the embodiment of the present disclosure, the system is configured so that the autonomous driving vehicle can be stopped by gesture only in the event of a disaster, whereby the autonomous driving vehicle can operate normally according to a preset time schedule in normal times.

Next, a first embodiment according to the present disclosure will be described with reference to FIGS. 4A to 9. There are various gestures that differ depending on the person, region, and country in terms of gestures when requesting the autonomous driving vehicle to stop. In view of this, in the embodiment according to the present disclosure, a large number of representative gestures among these gestures are preliminarily selected as reference gestures, images of the selected reference gestures are captured by a camera, and, for example, the captured images of the gestures are acquired at regular intervals. The acquired images are converted into image data in which the morphological features of the gestures are extracted by an image processing device (not shown), and stored in the image processing device. In this way, the image data related to the reference gestures is stored in the image processing device.

Figure 4A:
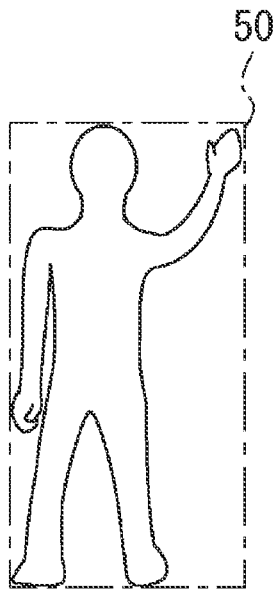
FIG. 4A is a diagram graphically illustrating gesture images.
Figure 4B:
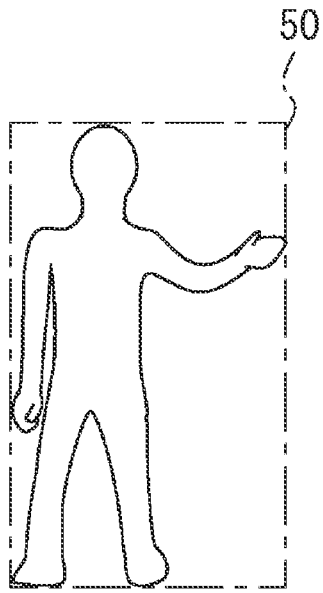
FIG. 4B is a diagram graphically illustrating gesture images.
Figure 4C:
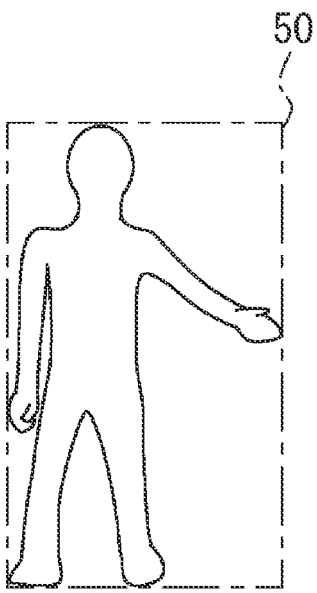
FIG. 4C is a diagram graphically illustrating gesture images.

To briefly explain the case where the well-known Regions with convolutional neural network (CNN) features (R-CNN) using a convolutional neural network is used in this image processing device, a bounding box surrounding a person is displayed on the screen captured by the camera. FIGS. 4A to 4C show an example of a reference gesture and a bounding box 50 surrounding a person, and FIG. 4A, FIG. 4B, and FIG. 4C graphically illustrate reference gesture images captured at regular intervals when a person is swinging one arm up and down. In this case, needless to say, Fast R-CNN, Faster R-CNN, You Only Look Once (YOLO), or single shot detector (SSD), which are developed forms of the R-CNN, can also be used. The electronic control unit 5 mounted on the vehicle 1 is adjusted so that the same image processing routine as the image processing routine in the image processing device can be executed.

Figure 5:
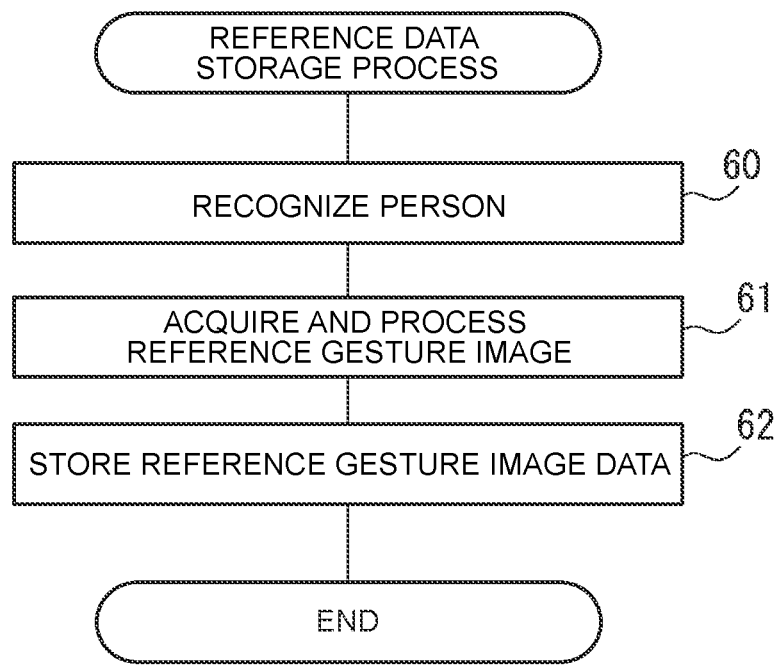
FIG. 5 is a flowchart for executing a reference data storage process.

Next, the reference data storage processing routine executed in the image processing device will be described with reference to FIG. 5. The bounding box 50 surrounding a person as shown in FIGS. 4A to 4C is displayed on the screen captured by the camera, and since the bounding box 50 is displayed, the existence of the person is recognized in step 60. Next, in step 61, a reference gesture image is acquired from the screen captured by the camera, and the acquired reference gesture image is converted into image data obtained by extracting morphological features from the gesture, that is, a vector called a CNN feature for the image. Subsequently, in step 62, the image data related to the reference gesture is stored. Such processes from step 60 to step 62 are performed on the images acquired at regular intervals of all the selected reference gestures. In this way, the image data related to the reference gestures is stored in the image processing device. The image data related to the reference gestures stored in the image processing device is stored in advance in the memory 8 of the electronic control unit 5.

Figure 6:
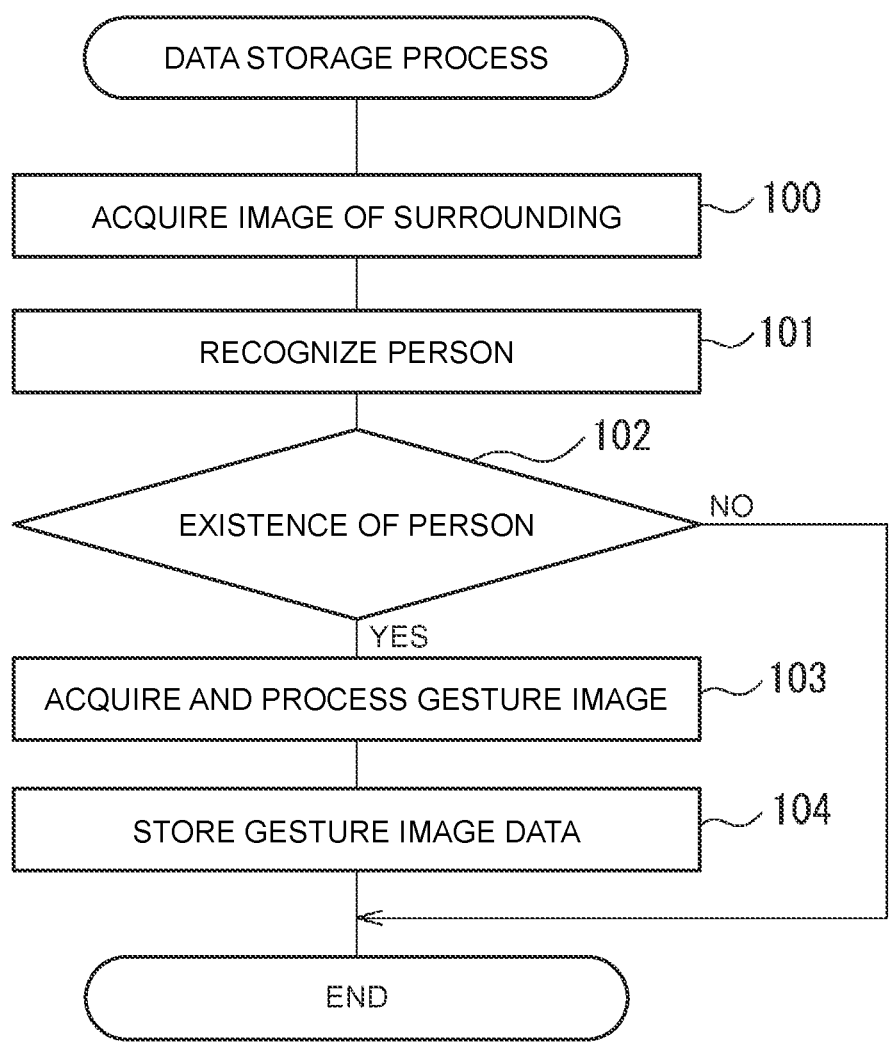
FIG. 6 is a flowchart for executing a data storage process.

FIG. 6 shows a data storage processing routine executed in the electronic control unit 5 mounted on the vehicle 1, while the vehicle 1 is traveling. This routine is executed by interrupts at regular intervals. Referring to FIG. 6, first, in step 100, an image of the surroundings of the traveling vehicle 1 that is being continuously captured by the camera which is one of the environment information sensors 11 mounted on the vehicle 1 is acquired. Next, in step 101, the process of recognizing the existence of a person is performed based on the screen captured by the camera. In this case, when there is a person around the vehicle 1, a bounding box surrounding the person is displayed on the screen captured by the camera, whereby the existence of the person is recognized. Subsequently, in step 102, it is discriminated from the screen captured by the camera whether there is a person around the vehicle 1. When it is discriminated that there is no person around the vehicle 1, the processing cycle is terminated. On the other hand, when it is discriminated that there is a person around the vehicle 1, the process proceeds to step 103.

In step 103, the gesture image of the person around the vehicle 1 is acquired from the screen captured by the camera, and the acquired gesture image is converted into image data obtained by extracting morphological features from the gesture. Next, in step 104, the acquired image data related to the gesture is stored in the memory 8 of the electronic control unit 5.

Figure 7:
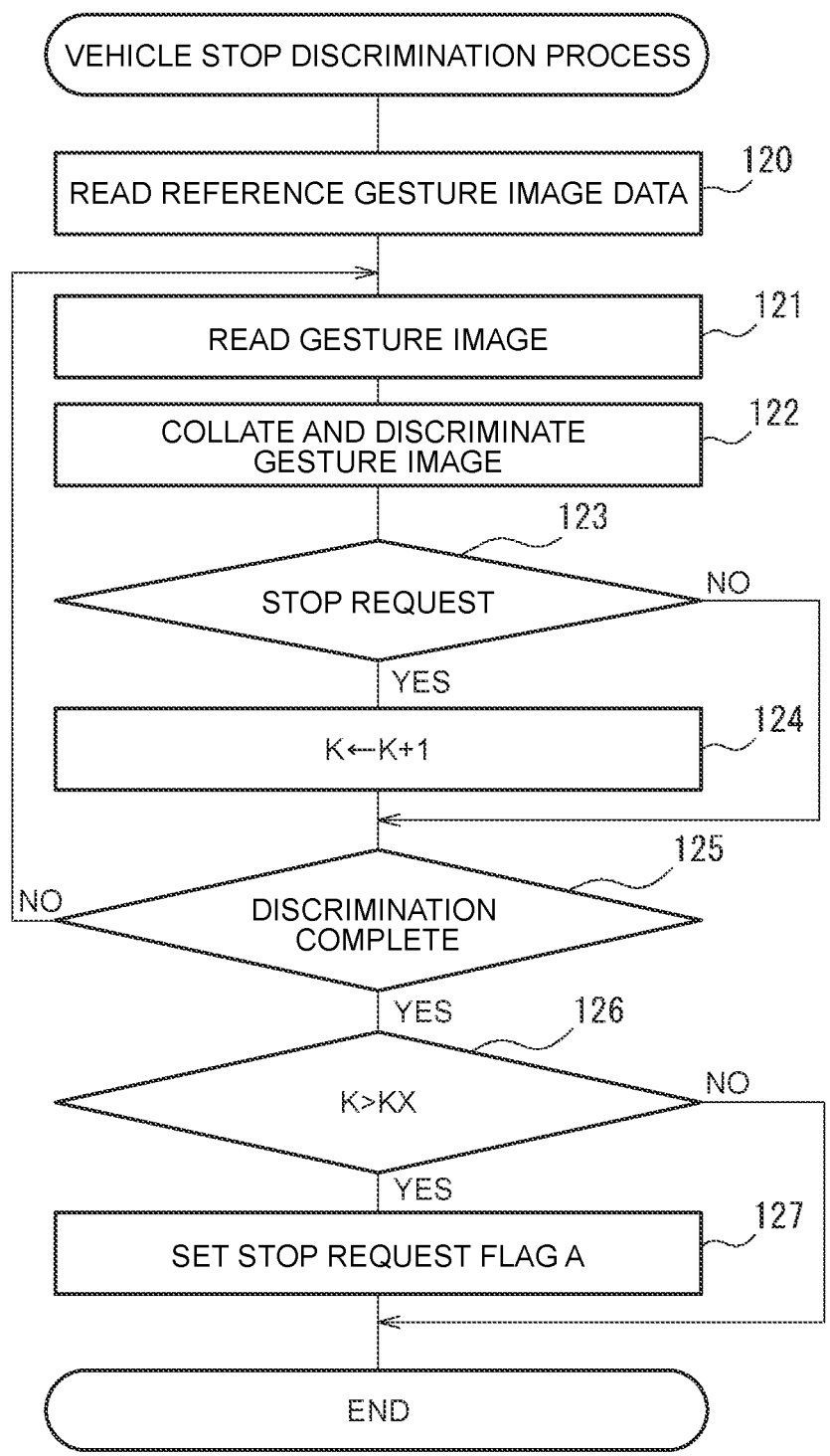
FIG. 7 is a flowchart for executing a vehicle stop discrimination process.

FIG. 7 shows a vehicle stop discrimination processing routine executed in the electronic control unit 5 mounted on the vehicle 1, while the vehicle 1 is traveling. This routine is executed by interrupts at regular intervals, the intervals being longer than the intervals of the data storage processing routine shown in FIG. 6. Referring to FIG. 7, first, in step 120, the image data related to the reference gesture stored in advance in the memory 8 of the electronic control unit 5 is read. Next, in step 121, the image data that is related to the gesture of the person around the vehicle 1 acquired during traveling and that is stored in the memory 8 of the electronic control unit 5 is read. Subsequently, in step 122, the image data related to the gesture of the person around the vehicle 1 acquired during traveling is collated with the image data related to the reference gesture to discriminate whether the image data related to the gesture of the person around the vehicle 1 acquired during traveling is a gesture requesting the vehicle 1 to stop.

When it is discriminated that the image data related to the gesture of the person around the vehicle 1 acquired during traveling is a gesture requesting the vehicle 1 to stop, in step 123, it is discriminated that there is a stop request for the vehicle 1. When the process proceeds to step 124, a count value K is incremented by one, and the process proceeds to step 125. On the other hand, in step 123, when it is discriminated that there is no stop request for the vehicle 1, the process jumps to step 125. In step 125, it is discriminated whether the collation and discrimination operations of the gesture image have been performed a certain number of times, and when the collation and discrimination operations of the gesture image have only been performed equal to or less than the certain number of times, it is determined that the discrimination has not been completed, and the process returns to step 121. On the other hand, when the collation and discrimination operations of the gesture image have been performed a certain number of times, it is determined that the discrimination is completed, and the process proceeds to step 126.

In step 126, it is discriminated whether the count value K exceeds a fixed value KX. When the count value K exceeds the fixed value KX, the process proceeds to step 127 to set a stop request flag A for requesting the vehicle 1 to stop. Then, the processing cycle is terminated. On the other hand, when the count value K does not exceed the fixed value KX, the processing cycle is terminated. That is, when the image data related to the gesture of the person around the vehicle 1 acquired during traveling is collated with the image data related to the reference gesture, and the ratio of the discrimination results that the image data related to the gesture of the person around the vehicle 1 acquired during traveling is a gesture requesting the vehicle 1 to stop is equal to or more than a certain ratio, it is determined that the image data related to the gesture of the person around the vehicle 1 acquired during traveling is a gesture requesting the vehicle 1 to stop, and thus the stop request flag A is set. The criteria for setting the stop request flag A described above is an example, and various other criteria can be used.

Figure 8:
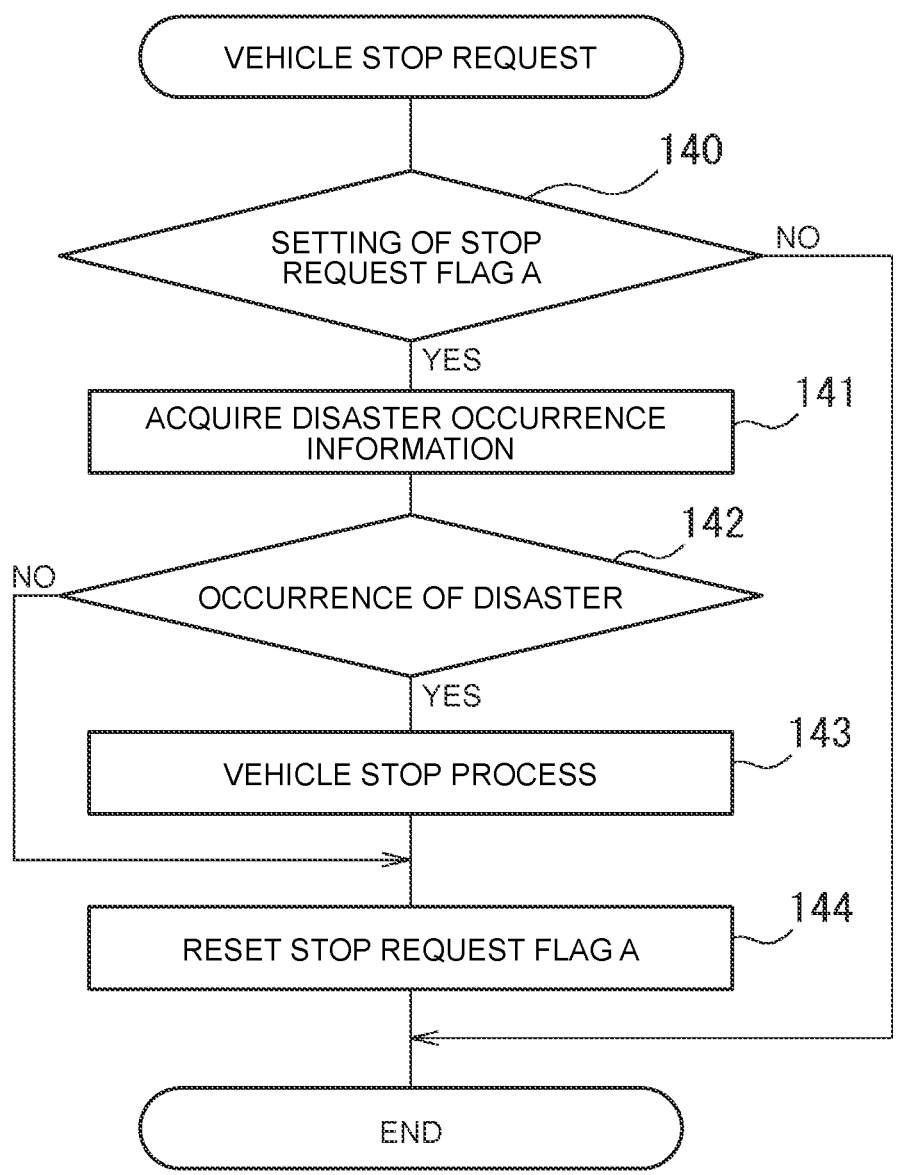
FIG. 8 is a flowchart for executing a vehicle stop request process.

FIG. 8 shows a vehicle stop request routine executed in the electronic control unit 5 mounted on the vehicle 1, while the vehicle 1 is traveling. This routine is executed by interrupts at regular intervals. With reference to FIG. 8, first, in step 140, it is discriminated whether the stop request flag A is set. When the stop request flag A is not set, the processing cycle is terminated. On the other hand, when the stop request flag A is set, the process proceeds to step 141, and information on the occurrence of disasters such as earthquakes, tsunamis, floods, fires, and heavy rains related to the traveling area of the vehicle 1 is acquired. As the disaster occurrence information, for example, external information related to the occurrence of the disaster acquired from the server 20 can be used, or information related to the occurrence of the disaster acquired by the environment information sensor 11 mounted on the vehicle 1 can be used. For example, a vibration sensor can be mounted on the vehicle 1 as the environment information sensor 11, and information on whether an earthquake has occurred can be acquired by this vibration sensor. Further, an inundation sensor can be mounted on the vehicle 1 as the environment information sensor 11, and information on whether a tsunami, flood, heavy rain, or the like has occurred can be acquired by this inundation sensor. In addition, it is possible to acquire information on whether an earthquake has occurred from images of damage to buildings and roads captured by the in-vehicle camera, and it is possible to acquire information on whether fire has occurred from images of flames and smoke captured by the in-vehicle camera.

Next, in step 142, it is discriminated whether a disaster has occurred based on the disaster occurrence information acquired in step 141. When it is discriminated that a disaster has occurred, the process proceeds to step 143, and a vehicle stop process for stopping the vehicle 1 around the person requesting the vehicle 1 to stop is performed. Then, the process proceeds to step 144, and the stop request flag A is reset. Thus, the processing cycle is terminated. On the other hand, when it is discriminated in step 142 that no disaster has occurred, the process jumps to step 144. Therefore, even when it is discriminated that the image data related to the gesture of the person around the vehicle 1 acquired during traveling is a gesture requesting the vehicle 1 to stop, when it is discriminated that no disaster has occurred, the vehicle stop process for stopping the vehicle 1 is not performed. That is, at this time, the vehicle 1 travels according to a preset time schedule.

Figure 9:
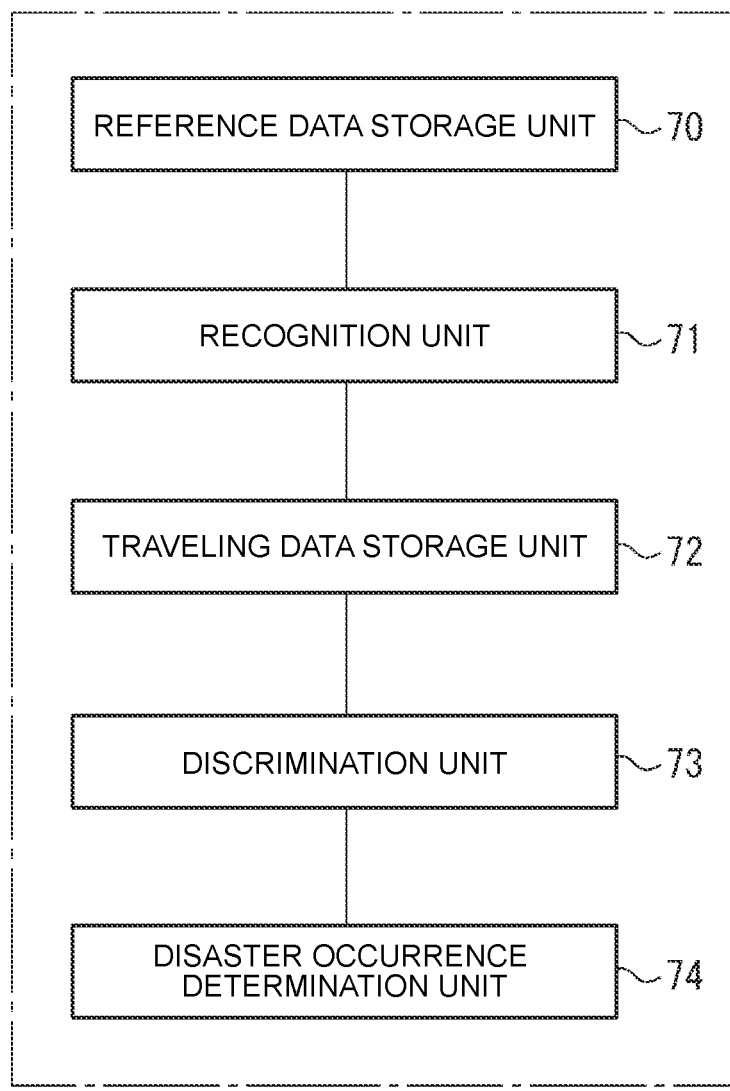
FIG. 9 is a functional configuration diagram of an embodiment of a vehicle control device according to the present disclosure.

That is, in the first embodiment according to the present disclosure, as shown in the functional configuration diagram of FIG. 9, the vehicle control device of the autonomous driving vehicle includes a reference data storage unit 70, a recognition unit 71, a traveling data storage unit 72, a discrimination unit 73, and a disaster occurrence determination unit 74. The reference data storage unit 70 stores in advance data related to the reference gesture image of a person when requesting the autonomous driving vehicle 1 to stop. The recognition unit 71 recognizes that there is a person around the autonomous driving vehicle 1 during autonomous traveling of the autonomous driving vehicle 1. The traveling data storage unit 72 stores data related to the gesture image of the person around the autonomous driving vehicle 1 when the recognition unit 71 recognizes that there is a person around the autonomous driving vehicle 1. The discrimination unit 73 discriminates whether the gesture of the person around the autonomous driving vehicle 1 is a gesture requesting the autonomous driving vehicle 1 to stop, by collating the data related to the reference gesture image stored in the reference data storage unit 70 with the data related to the gesture image stored in the traveling data storage unit 72. The disaster occurrence determination unit 74 determines whether a disaster related to the traveling area of the autonomous driving vehicle 1 has occurred. When the discrimination unit 73 discriminates that the gesture of the person around the autonomous driving vehicle 1 is the gesture requesting the autonomous driving vehicle 1 to stop, and the disaster occurrence determination unit 74 determines that a disaster has occurred, the autonomous driving vehicle 1 is stopped around the person requesting the autonomous driving vehicle 1 to stop. From another point of view, the first embodiment according to the present disclosure provides a vehicle control method for an autonomous driving vehicle 1 that autonomously travels based on an operation command. The vehicle control method includes: storing in advance data related to a reference gesture image of a person when requesting the autonomous driving vehicle 1 to stop; storing data related to a gesture image of a person around the autonomous driving vehicle 1, when an existence of the person around the autonomous driving vehicle 1 is recognized during autonomous traveling of the autonomous driving vehicle 1; discriminating whether a gesture of the person around the autonomous driving vehicle 1 is a gesture requesting the autonomous driving vehicle 1 to stop, by performing collation of the stored data related to the reference gesture image with the stored data related to the gesture image; determining whether a disaster related to a traveling area of the autonomous driving vehicle 1 has occurred; and causing the autonomous driving vehicle 1 to stop around the person requesting the autonomous driving vehicle 1 to stop, when it is discriminated that the gesture of the person around the autonomous driving vehicle 1 is the gesture requesting the autonomous driving vehicle 1 to stop, and it is determined that the disaster has occurred. Further, the first embodiment according to the present disclosure provides a program that causes a computer to execute the above vehicle control method, and a computer-readable storage medium that stores the program.

In the event of a disaster, depending on the victim, the autonomous driving vehicle 1 may be requested to stop by words instead of by gesture. In some embodiments, in this case, a vehicle driving system is constructed so that the autonomous driving vehicle 1 can be stopped regardless of whether the autonomous driving vehicle 1 is requested to stop by gesture or whether the autonomous driving vehicle 1 is requested to stop by words. Therefore, in the modification of the first embodiment according to the present disclosure, the vehicle driving system is constructed so that the autonomous driving vehicle 1 can be stopped when it is determined that a disaster has occurred, regardless of whether the autonomous driving vehicle 1 has been requested to stop by gesture or whether the autonomous driving vehicle 1 has been requested to stop by words.

Figure 10:
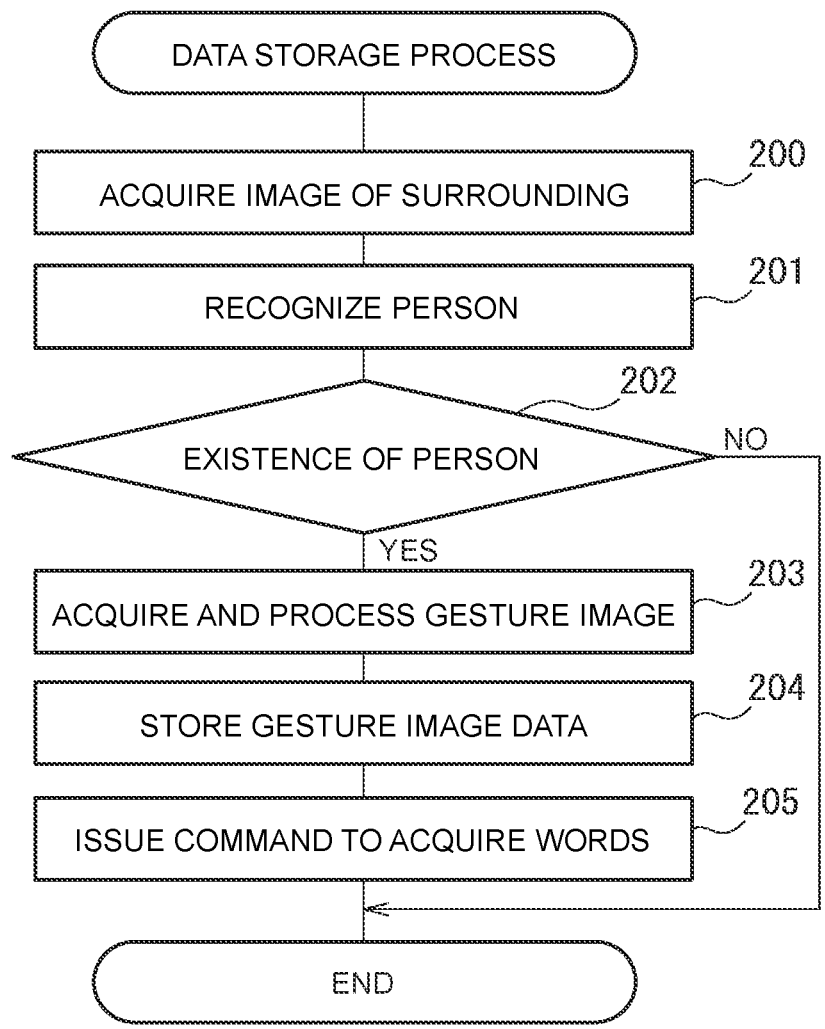
FIG. 10 is a flowchart for executing a data storage process.
Figure 11:
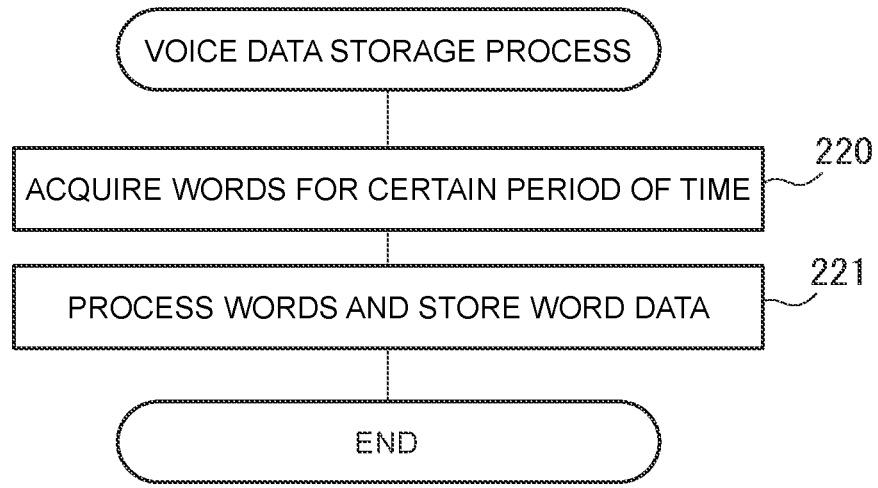
FIG. 11 is a flowchart for executing a voice data storage process.
Figure 12:
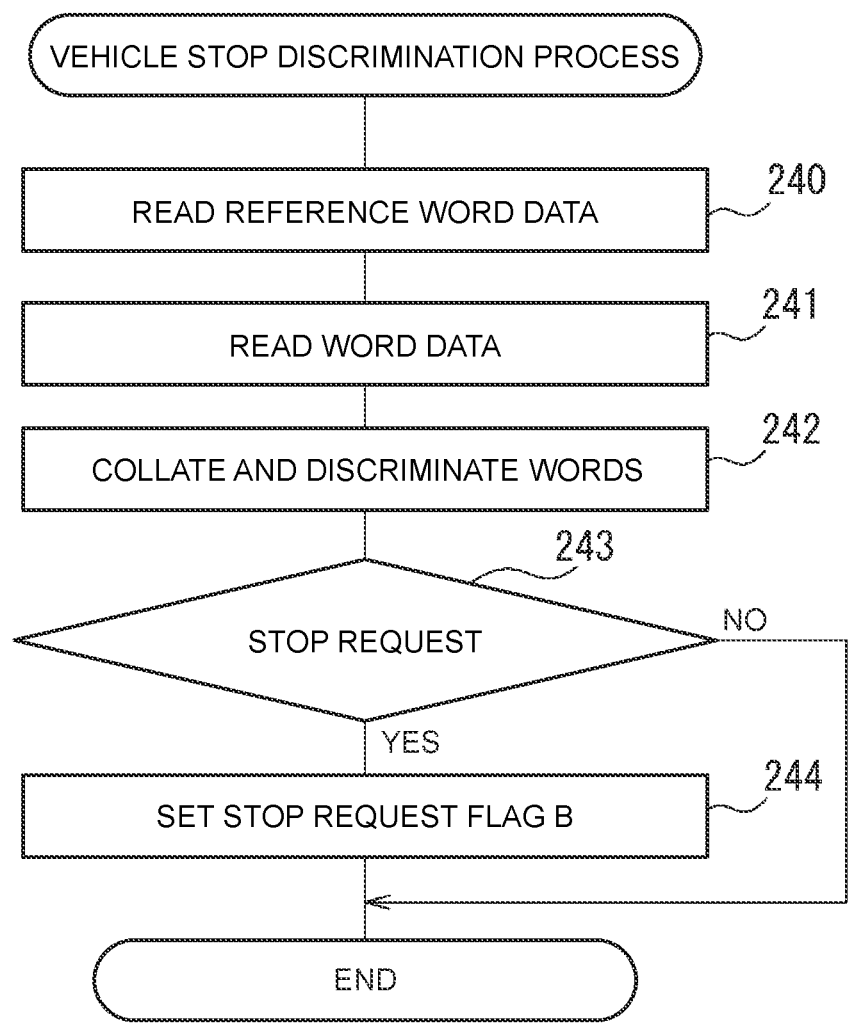
FIG. 12 is a flowchart for executing a vehicle stop discrimination process.
Figure 13:
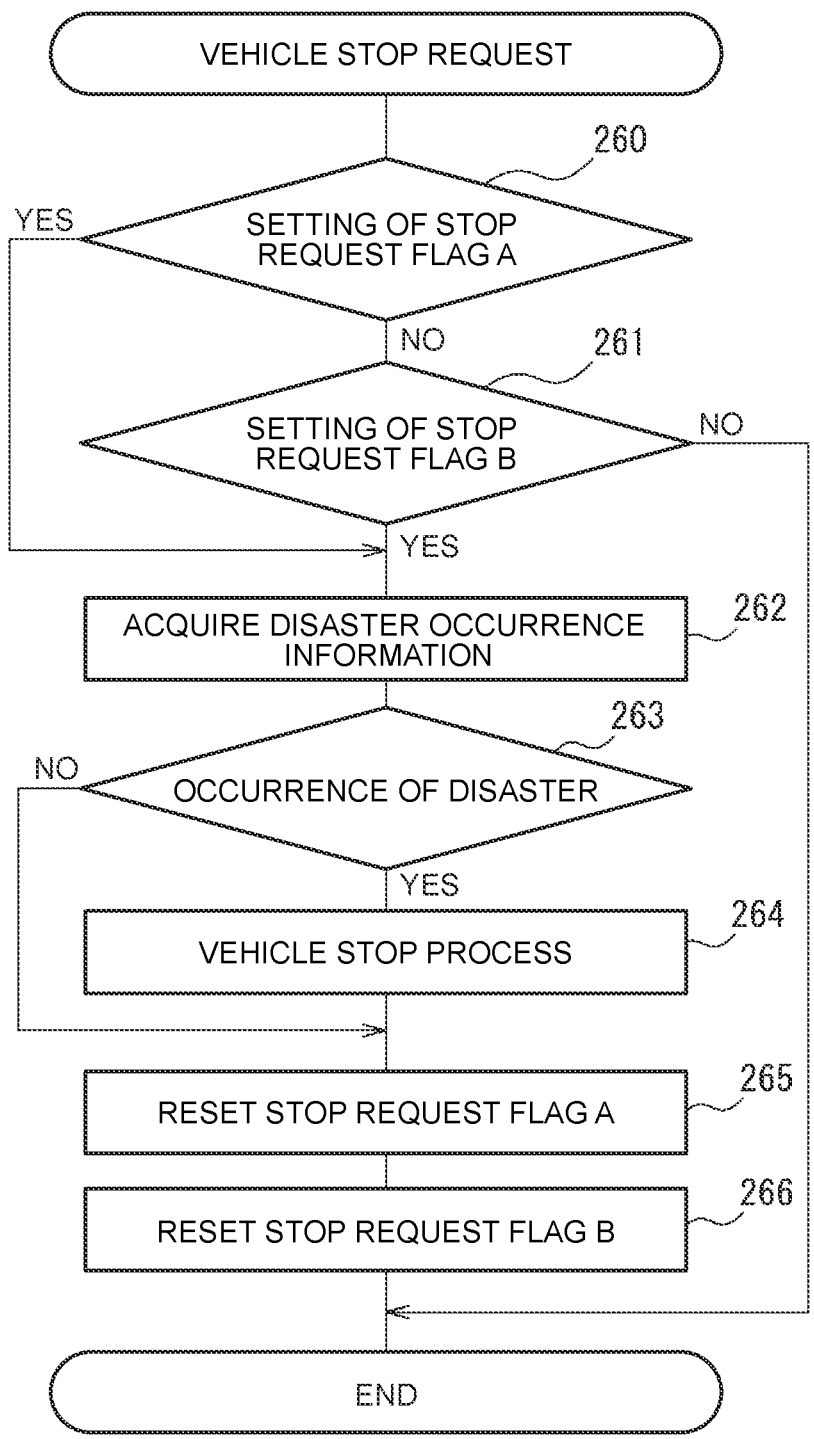
FIG. 13 is a flowchart for executing a vehicle stop request process.

FIGS. 10 to 13 show various routines used in the modification of the first embodiment according to the present disclosure. In this modification, the reference data storage processing routine shown in FIG. 5 and the vehicle stop discrimination processing routine shown in FIG. 7 are used as they are. Further, in this modification, a data storage processing routine shown in FIG. 10, a voice data storage processing routine shown in FIG. 11, and a vehicle stop discrimination processing routine shown in FIG. 12 are used instead of the data storage processing routine shown in FIG. 6, and a vehicle stop request routine shown in FIG. 13 is used instead of the vehicle stop request routine shown in FIG. 8.

Next, the modification of the first embodiment according to the present disclosure will be described with reference to FIGS. 10 to 13. FIG. 10 shows the data storage processing routine executed in the electronic control unit 5 mounted on the vehicle 1, while the vehicle 1 is traveling. This routine is executed by interrupts at regular intervals. Referring to FIG. 10, first, in step 200, an image of the surroundings of the traveling vehicle 1 that is being continuously captured by the camera which is one of the environment information sensors 11 mounted on the vehicle 1 is acquired. Next, in step 201, the process of recognizing the existence of a person is performed from the screen captured by the camera. In this case, when there is a person around the vehicle 1, a bounding box surrounding the person is displayed on the screen captured by the camera, whereby the existence of the person is recognized. Subsequently, in step 202, it is discriminated from the screen captured by the camera whether there is a person around the vehicle 1. When it is discriminated that there is no person around the vehicle 1, the processing cycle is terminated. On the other hand, when it is discriminated that there is a person around the vehicle 1, the process proceeds to step 203.

In step 203, the gesture image of the person around the vehicle 1 is acquired from the screen captured by the camera, and the acquired gesture image is converted into image data obtained by extracting morphological features from the gesture. Next, in step 204, the acquired image data related to the gesture is stored in the memory 8 of the electronic control unit 5. Subsequently, in step 205, a command to acquire the words of the person around the vehicle 1 is issued. When the command to acquire the words of the person around the vehicle 1 is issued, the voice data storage processing routine shown in FIG. 11 is executed.

Referring to FIG. 11, first, in step 220, the words of the person around the vehicle 1 are acquired for a certain period of time. In this case, the words of the person around the vehicle 1 are acquired by a sound collector mounted as one of the environment information sensors 11. Next, in step 221, a feature amount is extracted from the words of the person around the vehicle 1 using voice recognition technology, the words are documented based on the extracted feature amount, and the documented data, that is, data related to the words is stored in the memory 8 of the electronic control unit 5.

FIG. 12 shows a vehicle stop discrimination processing routine executed in the electronic control unit 5 mounted on the vehicle 1, while the vehicle 1 is traveling. This routine is executed by interrupts at regular intervals, the intervals being longer than the intervals of the data storage processing routine shown in FIG. 10. Referring to FIG. 12, first, in step 240, data related to reference words stored in advance in the memory 8 of the electronic control unit 5 is read. To describe the reference words, there are various words that differ depending on the person, region, and country when requesting the autonomous driving vehicle to stop. Examples of such words include "pick me up" and "help". Therefore, in this modification, a large number of representative words among these words are selected in advance as the reference words, and the reference words are acquired by the sound collector by having a person speak the selected reference words. When the reference words are acquired, the feature amount is extracted from the reference words using voice recognition technology, the words are documented based on the extracted feature amount, and the documented data, that is, data related to the words is stored in the memory 8 of the electronic control unit 5. In step 240, the data related to the reference words stored in advance in the memory 8 of the electronic control unit 5 is read.

Next, in step 241, data that is related to the words of the person around the vehicle 1 acquired during traveling and that is stored in the memory 8 of the electronic control unit 5 is read. Subsequently, in step 242, the data related to the words of the person around the vehicle 1 acquired during traveling is collated with the data related to the reference words to discriminate whether the data related to the words of the person around the vehicle 1 acquired during traveling is words requesting the vehicle 1 to stop. When it is discriminated that the data related to the words of the person around the vehicle 1 acquired during traveling is the words requesting the vehicle 1 to stop, in step 243, it is discriminated that there is a stop request for the vehicle 1. When the process proceeds to step 244, a stop request flag B requesting the vehicle 1 to stop is set, and then the processing cycle is terminated. On the other hand, in step 243, when it is discriminated that there is no stop request for the vehicle 1, the processing cycle is terminated.

FIG. 13 shows a vehicle stop request routine executed in the electronic control unit 5 mounted on the vehicle 1, while the vehicle 1 is traveling. This routine is executed by interrupts at regular intervals. Referring to FIG. 13, first, in step 260, it is discriminated whether the stop request flag A set in the vehicle stop discrimination processing routine shown in FIG. 7 is set. When the stop request flag A is set, the process jumps to step 262. On the other hand, when the stop request flag A is not set, the process proceeds to step 261 to discriminate whether the stop request flag B set in the vehicle stop discrimination processing routine shown in FIG. 12 is set. When the stop request flag B is set, the process proceeds to step 262. On the other hand, when the stop request flag B is not set, the processing cycle is terminated.

Therefore, the process proceeds to step 262 when the stop request flag A is set or when the stop request flag B is set, that is, when the gesture of the person around the vehicle 1 is discriminated to be the gesture requesting the vehicle 1 to stop, or when the words of the person around the vehicle 1 are discriminated to be the words requesting the vehicle 1 to stop. In step 262, information on the occurrence of disasters such as earthquakes, tsunamis, floods, fires, and heavy rains related to the traveling area of the vehicle 1 is acquired. Next, in step 263, it is discriminated whether a disaster has occurred based on the disaster occurrence information acquired in step 262. When it is discriminated that a disaster has occurred, the process proceeds to step 264, and a vehicle stop process for stopping the vehicle 1 around the person requesting the vehicle 1 to stop is performed. Subsequently, the process proceeds to step 265 to reset the stop request flag A, and then to step 266 to reset the stop request flag B. Thus, the processing cycle is terminated. On the other hand, when it is discriminated in step 263 that no disaster has occurred, the process jumps to step 265. Therefore, even when it is discriminated that the gesture of the person around the vehicle 1 is the gesture requesting the vehicle 1 to stop, or even when it is discriminated that the words of the person around the vehicle 1 are the words requesting the vehicle 1 to stop, when it is discriminated that no disaster has occurred, the vehicle stop process for stopping the vehicle 1 is not performed. That is, at this time, the vehicle 1 travels according to a preset time schedule.

That is, in the modification of the first embodiment according to the present disclosure, in the functional configuration diagram of FIG. 9, the reference data storage unit 70 stores in advance the data related to the reference words when requesting the autonomous driving vehicle 1 to stop in addition to the data related to the reference gesture image of the person when requesting the autonomous driving vehicle 1 to stop, and the traveling data storage unit 72 stores the data related to the words of the person around the autonomous driving vehicle 1 in addition to the data related to the gesture image of the person around the autonomous driving vehicle 1. Further, the discrimination unit 73 discriminates whether the gesture of the person around the autonomous driving vehicle 1 is the gesture requesting the autonomous driving vehicle 1 to stop or whether the words of the person around the autonomous driving vehicle 1 are the words requesting the autonomous driving vehicle 1 to stop, by performing at least one of the collation of the data related to the reference gesture image stored in the reference data storage unit 70 with the data related to the gesture image stored in the traveling data storage unit 72 and collation of the data related to the reference words stored in the reference data storage unit 70 with the data related to the words stored in the traveling data storage unit 72. In this case, when the discrimination unit 73 discriminates that the gesture of the person around the autonomous driving vehicle 1 is the gesture requesting the autonomous driving vehicle 1 to stop, or that the words of the person around the autonomous driving vehicle 1 are the words requesting the autonomous driving vehicle 1 to stop, and the disaster occurrence determination unit 74 determines that a disaster has occurred, the autonomous driving vehicle 1 is caused to stop around the person requesting the autonomous driving vehicle 1 to stop.

Next, a second embodiment according to the present disclosure will be described with reference to FIGS. 14 and 15. In the second embodiment, the reference data storage processing routine shown in FIG. 5, the vehicle stop discrimination processing routine shown in FIG. 7, the data storage processing routine shown in FIG. 10, the voice data storage processing routine shown in FIG. 11, and the vehicle stop discrimination processing routine shown in FIG. 12 are used as they are, and the vehicle stop request routine shown in FIG. 14 is used instead of the vehicle stop request routine shown in FIGS. 8 and 13.

Figure 14:
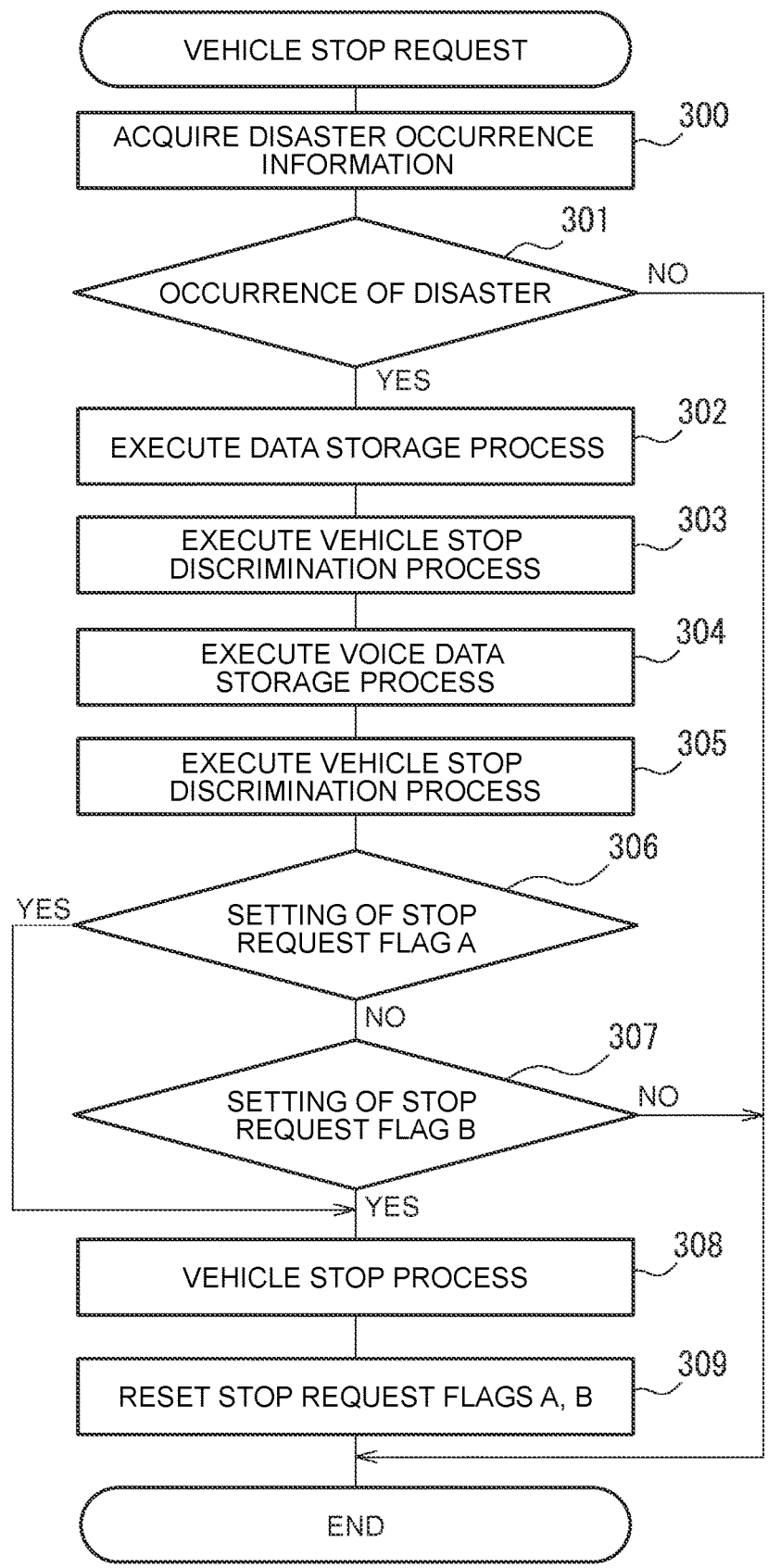
FIG. 14 is a flowchart for executing a vehicle stop request process.

The vehicle stop request routine shown in FIG. 14 is executed by interrupts at regular intervals in the electronic control unit 5 mounted on the vehicle 1, while the vehicle 1 is traveling. Referring to FIG. 14, first, in step 300, the information on the occurrence of disasters such as earthquakes, tsunamis, floods, fires, and heavy rains related to the traveling area of the vehicle 1 is acquired. Next, in step 301, it is discriminated whether a disaster has occurred based on the disaster occurrence information acquired in step 300. When it is discriminated that no disaster has occurred, the processing cycle is terminated. On the other hand, when it is discriminated that a disaster has occurred, the process proceeds to step 302 and various processing routines are executed.

That is, in step 302, the data storage processing routine shown in FIG. 10 is executed, in step 303, the vehicle stop discrimination processing routine shown in FIG. 7 is executed, in step 304, the voice data storage processing routine shown in FIG. 11 is executed in response to a request, and in step 305, the vehicle stop discrimination processing routine shown in FIG. 12 is executed. As described above, in the second embodiment, the data storage processing routine shown in FIG. 10, the vehicle stop discrimination processing routine shown in FIG. 7, the voice data storage processing routine shown in FIG. 11, and the vehicle stop discrimination processing routine shown in FIG. 12 are executed only when it is discriminated that a disaster has occurred.

Next, in step 306, it is discriminated whether the stop request flag A set in the vehicle stop discrimination processing routine shown in FIG. 7 is set. When the stop request flag A is set, the process jumps to step 308. On the other hand, when the stop request flag A is not set, the process proceeds to step 307 to discriminate whether the stop request flag B set in the vehicle stop discrimination processing routine shown in FIG. 12 is set. When the stop request flag B is set, the process proceeds to step 308. On the other hand, when the stop request flag B is not set, the processing cycle is terminated.

Therefore, the process proceeds to step 308 when the stop request flag A is set or when the stop request flag B is set, that is, when the gesture of the person around the vehicle 1 is discriminated to be the gesture requesting the vehicle 1 to stop, or when the words of the person around the vehicle 1 are discriminated to be the words requesting the vehicle 1 to stop. In step 308, the vehicle stop process for stopping the vehicle 1 around the person requesting the vehicle 1 to stop is performed. Subsequently, the process proceeds to step 309, and the stop request flag A and the stop request flag B are reset. Thus, the processing cycle is terminated. Therefore, when it is discriminated that no disaster has occurred, even when the gesture of the person around the vehicle 1 is the gesture requesting the vehicle 1 to stop, or even when the words of the person around the vehicle 1 are the words requesting the vehicle 1 to stop, the vehicle stop process for stopping the vehicle 1 is not performed. That is, at this time, the vehicle 1 travels according to a preset time schedule.

Figure 15:
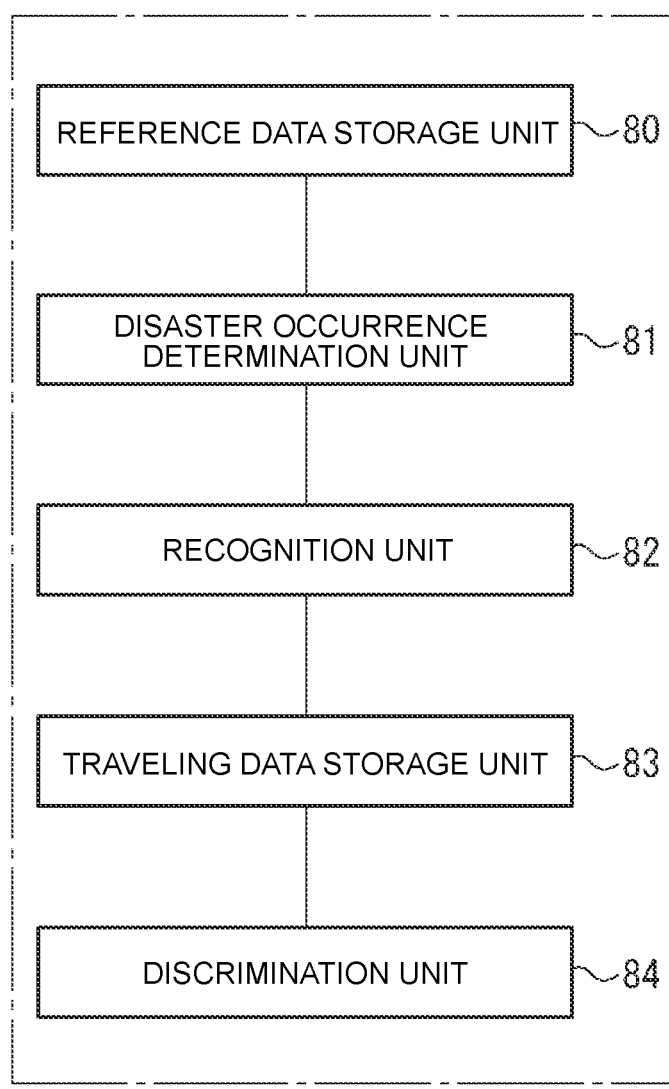
FIG. 15 is a functional configuration diagram of another embodiment of the vehicle control device according to the present disclosure.

That is, in the second embodiment according to the present disclosure, as shown in the functional configuration diagram of FIG. 15, the vehicle control device of the autonomous driving vehicle includes a reference data storage unit 80, a disaster occurrence determination unit 81, a recognition unit 82, a traveling data storage unit 83, and a discrimination unit 84. The reference data storage unit 80 stores in advance data related to the reference gesture image of a person when requesting the autonomous driving vehicle 1 to stop and data related to the reference words when requesting the autonomous driving vehicle 1 to stop. The disaster occurrence determination unit 81 determines whether a disaster related to the traveling area of the autonomous driving vehicle 1 has occurred. The recognition unit 82 recognizes that there is a person around the autonomous driving vehicle 1 during autonomous traveling of the autonomous driving vehicle 1, when the disaster occurrence determination unit 81 determines that a disaster has occurred. The traveling data storage unit 83 stores data related to the gesture image of the person around the autonomous driving vehicle 1 and data related to the words of the person around the autonomous driving vehicle 1 when the disaster occurrence determination unit 81 determines that a disaster has occurred and the recognition unit 82 recognizes that there is a person around the autonomous driving vehicle 1. The discrimination unit 84 discriminates, when the disaster occurrence determination unit 81 determines that a disaster has occurred, whether the gesture of the person around the autonomous driving vehicle 1 is a gesture requesting the autonomous driving vehicle 1 to stop or whether the words of the person around the autonomous driving vehicle 1 are words requesting the autonomous driving vehicle 1 to stop, by performing at least one of collation of the data related to the reference gesture image stored in the reference data storage unit 80 with the data related to the gesture image stored in the traveling data storage unit 83 and collation of the data related to the reference words stored in the reference data storage unit 80 with the data related to the words stored in the traveling data storage unit 83. When the discrimination unit 84 discriminates that the gesture of the person around the autonomous driving vehicle 1 is the gesture requesting the autonomous driving vehicle 1 to stop, or that the words of the person around the autonomous driving vehicle 1 are the words requesting the autonomous driving vehicle 1 to stop, the autonomous driving vehicle 1 is caused to stop around the person requesting the autonomous driving vehicle 1 to stop.

The method of causing the vehicle 1 to stop when a disaster has occurred and a person around the vehicle 1 requests the vehicle 1 to stop by gesture or by words has been described with reference to three examples, namely the first embodiment, the modification of the first embodiment, and the second embodiment. However, for example, when the vehicle 1 is already full, even if there is a person requesting the vehicle 1 to stop, the person may be inevitably refused to board the vehicle 1. In some embodiments, that is, considering such a case, it can be said to determine, when there is a person requesting the vehicle 1 to stop, whether to allow the person to board the vehicle 1. This can be applied to any of the first embodiment, the modification of the first embodiment, and the second embodiment.

Figure 16:
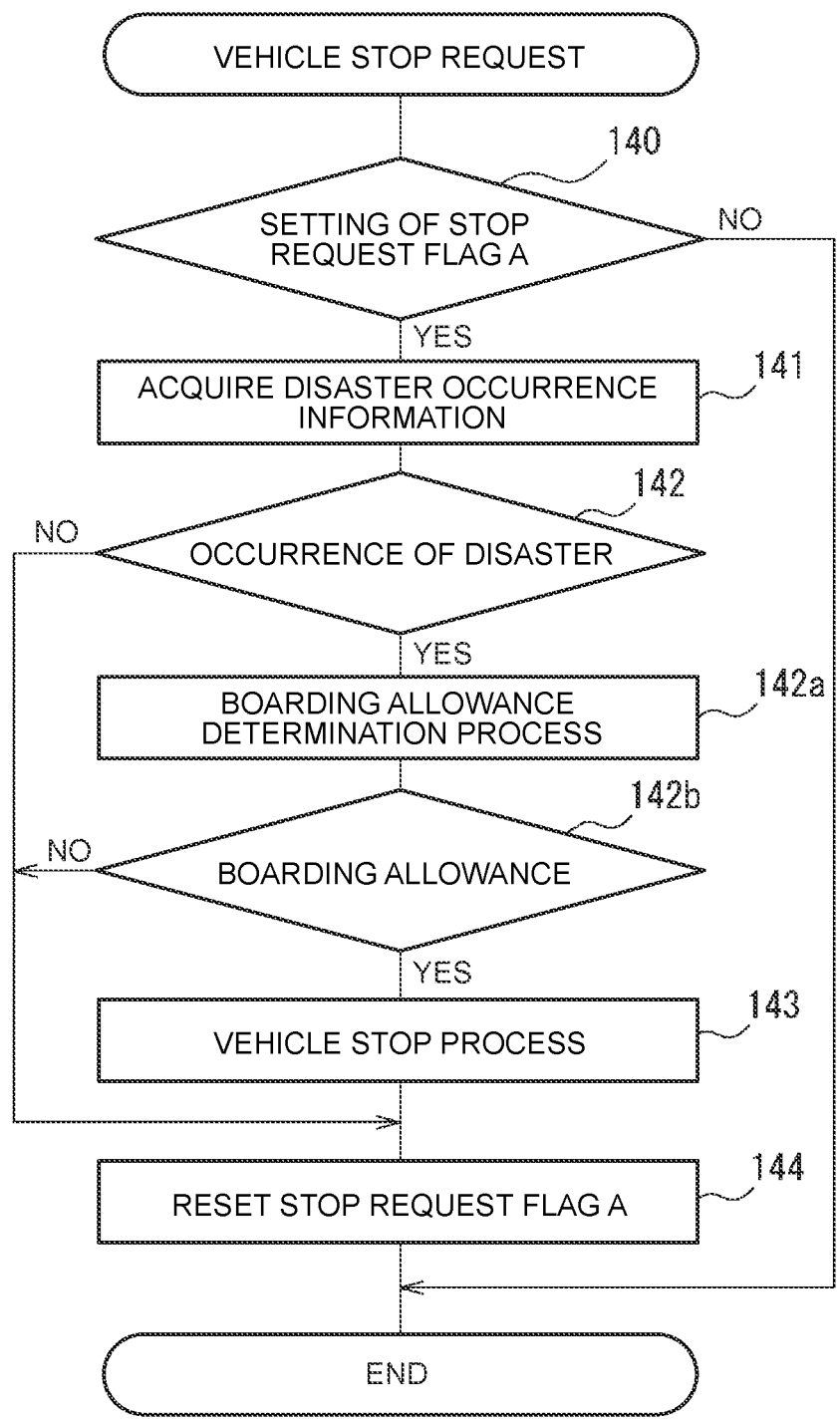
FIG. 16 is a flowchart for executing a vehicle stop request process.

In view of this, next, the case where a boarding allowance determination process for determining whether the person who requested the vehicle 1 to stop is allowed to board the vehicle 1 is performed in the first embodiment, the modification of the first embodiment, and the second embodiment will be described in order below. When the boarding allowance determination process is performed in the first embodiment, the vehicle stop request routine shown in FIG. 16 is used instead of the vehicle stop request routine shown in FIG. 8. The difference between the vehicle stop request routine shown in FIG. 16 and the vehicle stop request routine shown in FIG. 8 is only that, in the vehicle stop request routine shown in FIG. 16, step 142a and step 142b are added between step 142 and step 143 of the vehicle stop request routine shown in FIG. 8, and the remaining steps 140 to 144 are the same as steps 140 to 144 shown in FIG. 8. Therefore, the vehicle stop request routine shown in FIG. 16 will be described below only for the parts related to step 142a and step 142b.

Referring to FIG. 16, when it is discriminated in step 142 that a disaster has occurred, the process proceeds to step 142a to perform a determination process on whether to allow the person requesting the vehicle 1 to stop to board. Next, in step 142b, based on the result of the boarding allowance determination process in step 142a, it is discriminated whether the person requesting the vehicle 1 to stop is allowed to board. When it is discriminated that the person requesting the vehicle 1 to stop is allowed to board, the process proceeds to step 143 to perform a vehicle stop process for stopping the vehicle 1 around the person requesting the vehicle 1 to stop. Then, the process proceeds to step 144, and the stop request flag A is reset. On the other hand, in step 142b, when it is discriminated that the person requesting the vehicle 1 to stop is not allowed to board, the process jumps to step 144. Therefore, even when it is discriminated that the image data related to the gesture of the person around the vehicle 1 acquired during traveling is the gesture requesting the vehicle 1 to stop, when it is discriminated that the person requesting the vehicle 1 to stop is not allowed to board, the vehicle stop process for stopping the vehicle 1 is not performed.

Figure 17:
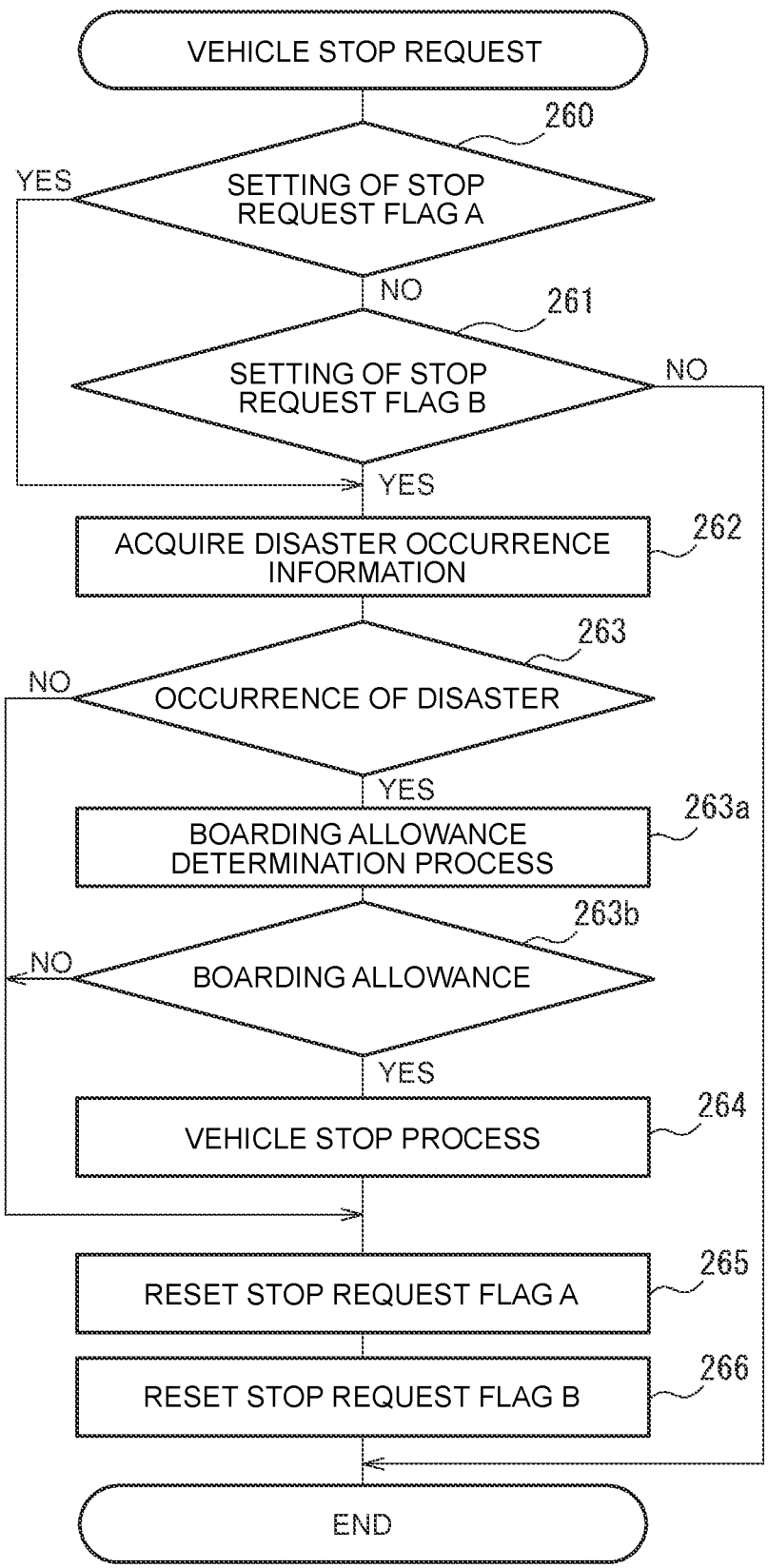
FIG. 17 is a flowchart for executing a vehicle stop request process.

Next, a case where the boarding allowance determination process for determining whether the person who requested the vehicle 1 to stop is allowed to board the vehicle 1 is applied to the modification of the first embodiment will be described. In this case, the vehicle stop request routine shown in FIG. 17 is used instead of the vehicle stop request routine shown in FIG. 13. The difference between the vehicle stop request routine shown in FIG. 17 and the vehicle stop request routine shown in FIG. 13 is only that, in the vehicle stop request routine shown in FIG. 17, step 263a and step 263b are added between step 263 and step 264 of the vehicle stop request routine shown in FIG. 13, and the remaining steps 260 to 266 are the same as steps 260 to 266 shown in FIG. 13. Therefore, the vehicle stop request routine shown in FIG. 17 will be described below only for the parts related to step 263a and step 263b.

Referring to FIG. 17, when it is discriminated in step 263 that a disaster has occurred, the process proceeds to step 263a to perform a determination process on whether to allow the person requesting the vehicle 1 to stop to board. Next, in step 263b, based on the result of the boarding allowance determination process in step 263a, it is discriminated whether the person requesting the vehicle 1 to stop is allowed to board. When it is discriminated that the person requesting the vehicle 1 to stop is allowed to board, the process proceeds to step 264 to perform a vehicle stop process for stopping the vehicle 1 around the person requesting the vehicle 1 to stop. Then, the process proceeds to step 265, and the stop request flag A is reset. On the other hand, in step 263b, when it is discriminated that the person requesting the vehicle 1 to stop is not allowed to board, the process jumps to step 265. Therefore, even when it is discriminated that the image data related to the gesture of the person around the vehicle 1 acquired during traveling is the gesture requesting the vehicle 1 to stop, or even when it is discriminated that the words of the person around the vehicle 1 acquired during traveling are the words requesting the vehicle 1 to stop, when it is discriminated that the person requesting the vehicle 1 to stop is not allowed to board, the vehicle stop process for stopping the vehicle 1 is not performed.

Figure 18:
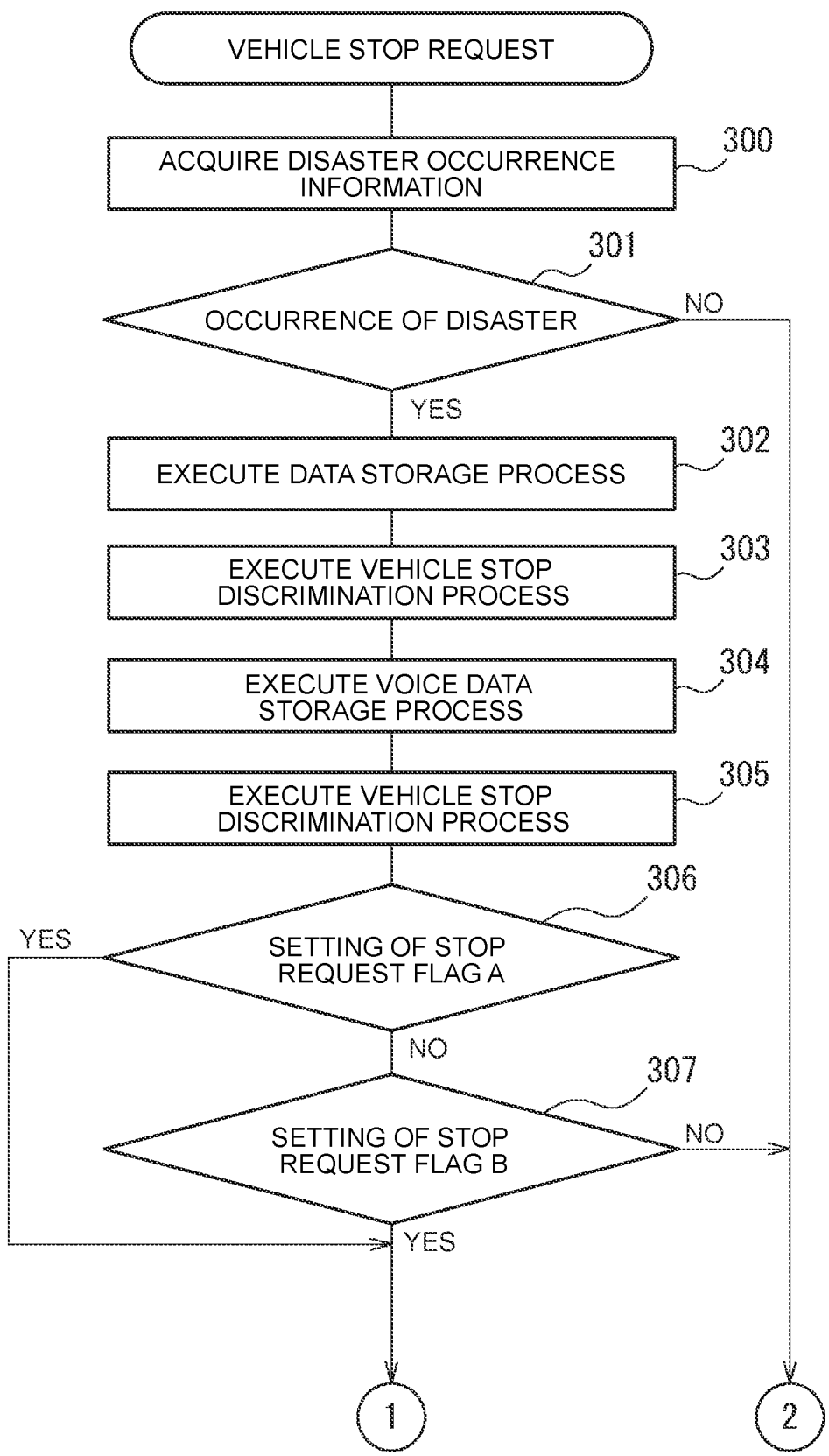
FIG. 18 is a flowchart for executing a vehicle stop request process.
Figure 19:
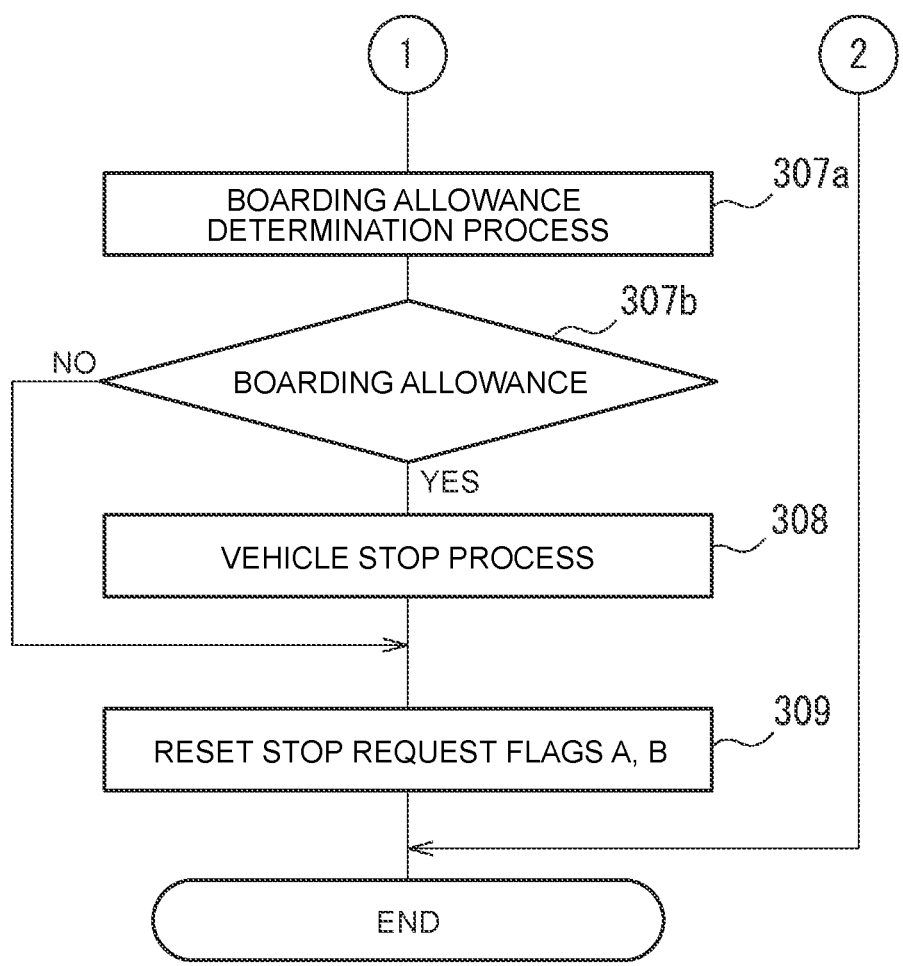
FIG. 19 is a flowchart for executing a vehicle stop request process.

Next, a case where the boarding allowance determination process for determining whether the person who requested the vehicle 1 to stop is allowed to board the vehicle 1 is applied to the second embodiment will be described. In this case, the vehicle stop request routine shown in FIGS. 18 and 19 is used instead of the vehicle stop request routine shown in FIG. 14. The difference between the vehicle stop request routine shown in FIG. 14 and the vehicle stop request routine shown in FIGS. 18 and 19 is only that, in the vehicle stop request routine shown in FIGS. 18 and 19, step 307a and step 307b are added between step 307 and step 308 of the vehicle stop request routine shown in FIG. 14, and the remaining steps 300 to 309 are the same as steps 300 to 309 shown in FIG. 14. Therefore, the vehicle stop request routine shown in FIGS. 18 and 19 will be described below only for the parts related to step 307a and step 307b.

Referring to FIGS. 18 and 19, when it is discriminated in step 306 that the stop request flag A set in the vehicle stop discrimination processing routine shown in FIG. 7 is set, or when it is discriminated in step 307 that the stop request flag B set in the vehicle stop discrimination processing routine shown in FIG. 12 is set, the process proceeds to step 307a to perform a determination process on whether to allow the person requesting the vehicle 1 to stop to board. Next, in step 307b, based on the result of the boarding allowance determination process in step 307a, it is discriminated whether the person requesting the vehicle 1 to stop is allowed to board. When it is discriminated that the person requesting the vehicle 1 to stop is allowed to board, the process proceeds to step 308 to perform a vehicle stop process for stopping the vehicle 1 around the person requesting the vehicle 1 to stop. Subsequently, the process proceeds to step 309, and the stop request flag A and the stop request flag B are reset. On the other hand, in step 307b, when it is discriminated that the person requesting the vehicle 1 to stop is not allowed to board, the process jumps to step 309. Therefore, even when it is discriminated that the image data related to the gesture of the person around the vehicle 1 acquired during traveling is the gesture requesting the vehicle 1 to stop, or even when it is discriminated that the words of the person around the vehicle 1 acquired during traveling are the words requesting the vehicle 1 to stop, when it is discriminated that the person requesting the vehicle 1 to stop is not allowed to board, the vehicle stop process for stopping the vehicle 1 is not performed.

In the first embodiment, the modification of the first embodiment, and the second embodiment, when the boarding allowance determination process for determining whether the person who requested the vehicle 1 to stop is allowed to board the vehicle 1 is performed, a boarding allowance determination unit for determining whether to allow a person requesting the vehicle 1 to stop to board the vehicle 1 is provided in the electronic control unit 5, and the boarding allowance determination unit determines whether the person requesting the vehicle 1 to stop is allowed to board the vehicle 1.

That is, in the embodiment according to the present disclosure, the boarding allowance determination unit is provided to determine whether a person requesting the autonomous driving vehicle 1 to stop is allowed to board the autonomous driving vehicle 1, when the disaster occurrence determination units 74 and 81 determine that a disaster has occurred. Even when the discrimination units 73 and 84 discriminate that the gesture of the person around the autonomous driving vehicle 1 is the gesture requesting the autonomous driving vehicle 1 to stop, or that the words of the person around the autonomous driving vehicle 1 are the words requesting the autonomous driving vehicle 1 to stop, when the boarding allowance determination unit determines that the person requesting the autonomous driving vehicle 1 to stop is not allowed to board the autonomous driving vehicle 1, the autonomous driving vehicle 1 is not stopped around the person requesting the autonomous driving vehicle 1 to stop.

In the boarding allowance determination process, the case where the person who requested the vehicle 1 to stop is refused to board the vehicle 1 includes cases where the vehicle 1 is full, that is, the case where the number of people who are already in the vehicle 1 has reached the allowable number of people, and may also include the case where the person who requested the vehicle 1 to stop is refused to board the vehicle 1 at the request of a person who is already in the vehicle 1. In this case, whether the vehicle 1 is full is discriminated based on, for example, the captured screen of the camera installed in the vehicle 1, and the determination on whether there is, in the people who are already in the vehicle 1, a person who refuses boarding of the person who requested the vehicle 1 to stop can be made by establishing in the vehicle 1 in advance a confirmation system that confirms the above by using a button or a touch panel installed in the vehicle 1, or a mobile terminal owned by the person who is already in the vehicle 1.

That is, in this case, in the embodiment according to the present disclosure, the boarding allowance determination unit provided in the electronic control unit 5 detects the number of people who are already in the autonomous driving vehicle 1 or the request of the person who is already in the autonomous driving vehicle 1, and when the number of people who are already in the autonomous driving vehicle 1 has reached an allowable number of people, or when the person who is already in the autonomous driving vehicle 1 refuses boarding of the person requesting the vehicle 1 to stop, the boarding allowance determination unit discriminates that the person requesting the autonomous driving vehicle 1 to stop is not allowed to board the autonomous driving vehicle 1. At this time, the autonomous driving vehicle 1 does not stop.

However, if it is determined that a person is requesting the vehicle 1 to stop by prank, the vehicle 1 should not be stopped. In this case, based on the image captured by the camera for external imaging that is mounted on the vehicle 1, it can be discriminated whether the request is a prank from the facial expression of the person who requested the vehicle 1 to stop, such as laughing or grinning.

That is, in this case, in the embodiment according to the present disclosure, the boarding allowance determination unit determines whether the stop request for the autonomous driving vehicle 1 is a prank based on the facial expression of the person requesting the autonomous driving vehicle 1 to stop. When the boarding allowance determination unit determines that the stop request for the autonomous driving vehicle 1 is a prank, the boarding allowance determination unit discriminates that the person requesting the autonomous driving vehicle 1 to stop is not allowed to board the autonomous driving vehicle 1. Therefore, at this time, the autonomous driving vehicle 1 does not stop.

What is claimed is:

1. A vehicle control device for an autonomous driving vehicle that autonomously travels based on an operation command, the vehicle control device comprising:
 a reference data storage unit that stores in advance data related to a reference gesture image of a person when requesting the autonomous driving vehicle to stop;
 a recognition unit that recognizes that there is a person around the autonomous driving vehicle during autonomous traveling of the autonomous driving vehicle;
 a traveling data storage unit that stores data related to a gesture image of the person around the autonomous driving vehicle, when the recognition unit recognizes that there is the person around the autonomous driving vehicle;
 a discrimination unit that discriminates whether a gesture of the person around the autonomous driving vehicle is a gesture requesting the autonomous driving vehicle to stop, by performing, a predetermined number of times, collation of the data related to the reference gesture image stored in the reference data storage unit with the data related to the gesture image stored in the traveling data storage unit; and a disaster occurrence determination unit that determines whether a disaster related to a traveling area of the autonomous driving vehicle has occurred, wherein when a ratio of the discrimination results that the gesture of the person around the autonomous driving vehicle is the gesture requesting the autonomous driving vehicle to stop is greater than a predetermined threshold, and the disaster occurrence determination unit determines that the disaster has occurred, the autonomous driving vehicle is caused to stop around the person requesting the autonomous driving vehicle to stop.

2. The vehicle control device according to claim 1, wherein:

the reference data storage unit stores in advance data related to reference words when requesting the autonomous driving vehicle to stop, in addition to the data related to the reference gesture image of the person when requesting the autonomous driving vehicle to stop;

the traveling data storage unit stores data related to words of the person around the autonomous driving vehicle in addition to the gesture image of the person around the autonomous driving vehicle;

the discrimination unit discriminates whether the gesture of the person around the autonomous driving vehicle is the gesture requesting the autonomous driving vehicle to stop or whether the words of the person around the autonomous driving vehicle are the words requesting the autonomous driving vehicle to stop, by performing at least one of the collation of the data related to the reference gesture image stored in the reference data storage unit with the data related to the gesture image stored in the traveling data storage unit and collation of the data related to the reference words stored in the reference data storage unit with the data related to the words stored in the traveling data storage unit; and when the discrimination unit discriminates that the gesture of the person around the autonomous driving vehicle is the gesture requesting the autonomous driving vehicle to stop, or that the words of the person around the autonomous driving vehicle are the words requesting the autonomous driving vehicle to stop, and the disaster occurrence determination unit determines that the disaster has occurred, the autonomous driving vehicle is caused to stop around the person requesting the autonomous driving vehicle to stop.

3. The vehicle control device according to claim 1, wherein when the disaster occurrence determination unit determines that no disaster has occurred, even when the gesture of the person around the autonomous driving vehicle is the gesture requesting the autonomous driving vehicle to stop, the autonomous driving vehicle is not caused to stop around the person requesting the autonomous driving vehicle to stop.

4. The vehicle control device according to claim 1, further comprising a boarding allowance determination unit that determines whether the person requesting the autonomous driving vehicle to stop is allowed to board the autonomous driving vehicle, when the disaster occurrence determination unit determines that the disaster has occurred, wherein even when the discrimination unit discriminates that the gesture of the person around the autonomous driving vehicle is the gesture requesting the autonomous driving vehicle to stop, when the boarding allowance determination unit determines that the person requesting the autonomous driving vehicle to stop is not allowed to board the autonomous driving vehicle, the autonomous driving vehicle is not caused to stop around the person requesting the autonomous driving vehicle to stop.

5. The vehicle control device according to claim 4, wherein when the boarding allowance determination unit detects a number of people who are already in the autonomous driving vehicle or a request of a person who is already in the autonomous driving vehicle, and the number of people who are already in the autonomous driving vehicle has reached an allowable number of people or the person who is already in the autonomous driving vehicle refuses boarding of the person requesting the autonomous driving vehicle to stop, the boarding allowance determination unit discriminates that the person requesting the autonomous driving vehicle to stop is not allowed to board the autonomous driving vehicle.

6. The vehicle control device according to claim 4, wherein the boarding allowance determination unit determines whether a stop request for the autonomous driving vehicle is a prank based on a facial expression of the person requesting the autonomous driving vehicle to stop, and when the boarding allowance determination unit determines that the stop request for the autonomous driving vehicle is a prank, the boarding allowance determination unit discriminates that the person requesting the autonomous driving vehicle to stop is not allowed to board the autonomous driving vehicle.

7. A vehicle control device for an autonomous driving vehicle that autonomously travels based on an operation command, the vehicle control device comprising:

a reference data storage unit that stores in advance data related to a reference gesture image of a person when requesting the autonomous driving vehicle to stop and data related to reference words when requesting the autonomous driving vehicle to stop;

a disaster occurrence determination unit that determines whether a disaster related to a traveling area of the autonomous driving vehicle has occurred;

a recognition unit that recognizes that there is a person around the autonomous driving vehicle during autonomous traveling of the autonomous driving vehicle, when the disaster occurrence determination unit determines that the disaster has occurred;

a traveling data storage unit that stores data related to a gesture image of the person around the autonomous driving vehicle and data related to words of the person around the autonomous driving vehicle, when the disaster occurrence determination unit determines that the disaster has occurred and the recognition unit recognizes that there is the person around the autonomous driving vehicle; and a discrimination unit that discriminates, when the disaster occurrence determination unit determines that the disaster has occurred, whether a gesture of the person around the autonomous driving vehicle is a gesture requesting the autonomous driving vehicle to stop or whether the words of the person around the autonomous driving vehicle are words requesting the autonomous driving vehicle to stop, by performing, a predetermined number of times, at least one of collation of the data related to the reference gesture image stored in the reference data storage unit with the data related to the gesture image stored in the traveling data storage unit and collation of the data related to the reference words stored in the reference data storage unit with the data related to the words stored in the traveling data storage unit, wherein when a ratio of the discrimination results that the gesture of the person around the autonomous driving vehicle is the gesture requesting the autonomous driving vehicle to stop is greater than a predetermined threshold, or that the words of the person around the autonomous driving vehicle are the words requesting the autonomous driving vehicle to stop, the autonomous driving vehicle is caused to stop around the person requesting the autonomous driving vehicle to stop.

8. The vehicle control device according to claim 7, wherein when the disaster occurrence determination unit determines that no disaster has occurred, even when the gesture of the person around the autonomous driving vehicle is the gesture requesting the autonomous driving vehicle to stop, or the words of the person around the autonomous driving vehicle are the words requesting the autonomous driving vehicle to stop, the autonomous driving vehicle is not caused to stop around the person requesting the autonomous driving vehicle to stop.

9. The vehicle control device according to claim 7, further comprising a boarding allowance determination unit that determines whether the person requesting the autonomous driving vehicle to stop is allowed to board the autonomous driving vehicle, wherein even when the discrimination unit discriminates that the gesture of the person around the autonomous driving vehicle is the gesture requesting the autonomous driving vehicle to stop or that the words of the person around the autonomous driving vehicle are the words requesting the autonomous driving vehicle to stop, when the boarding allowance determination unit determines that the person requesting the autonomous driving vehicle to stop is not allowed to board the autonomous driving vehicle, the autonomous driving vehicle is not caused to stop around the person requesting the autonomous driving vehicle to stop.

10. The vehicle control device according to claim 9, wherein when the boarding allowance determination unit detects a number of people who are already in the autonomous driving vehicle or a request of a person who is already in the autonomous driving vehicle, and the number of people who are already in the autonomous driving vehicle has reached an allowable number of people or the person who is already in the autonomous driving vehicle refuses boarding of the person requesting the autonomous driving vehicle to stop, the boarding allowance determination unit discriminates that the person requesting the autonomous driving vehicle to stop is not allowed to board the autonomous driving vehicle.

11. The vehicle control device according to claim 9, wherein the boarding allowance determination unit determines whether a stop request for the autonomous driving vehicle is a prank based on a facial expression of the person requesting the autonomous driving vehicle to stop, and when the boarding allowance determination unit determines that the stop request for the autonomous driving vehicle is a prank, the boarding allowance determination unit discriminates that the person requesting the autonomous driving vehicle to stop is not allowed to board the autonomous driving vehicle.

12. A vehicle control method for an autonomous driving vehicle that autonomously travels based on an operation command, the vehicle control method comprising:
  storing in advance data related to a reference gesture image of a person when requesting the autonomous driving vehicle to stop;
  storing data related to a gesture image of a person around the autonomous driving vehicle, when an existence of the person around the autonomous driving vehicle is recognized during autonomous traveling of the autonomous driving vehicle;
  discriminating whether a gesture of the person around the autonomous driving vehicle is a gesture requesting the autonomous driving vehicle to stop, by performing, a predetermined number of times, collation of the stored data related to the reference gesture image with the stored data related to the gesture image;
  determining whether a disaster related to a traveling area of the autonomous driving vehicle has occurred; and
  causing the autonomous driving vehicle to stop around the person requesting the autonomous driving vehicle to stop, when a ratio of the discrimination results that the gesture of the person around the autonomous driving vehicle is the gesture requesting the autonomous driving vehicle to stop is greater than a predetermined threshold, and it is determined that the disaster has occurred.

13. A non-transitory storage medium storing a program that causes a computer to:
  control an autonomous driving vehicle that autonomously travels based on an operation command;
  store in advance data related to a reference gesture image of a person when requesting the autonomous driving vehicle to stop;
  store data related to a gesture image of a person around the autonomous driving vehicle, when an existence of the person around the autonomous driving vehicle is recognized during autonomous traveling of the autonomous driving vehicle;
  discriminate whether a gesture of the person around the autonomous driving vehicle is a gesture requesting the autonomous driving vehicle to stop, by performing, a predetermined number of times, collation of the stored data related to the reference gesture image with the stored data related to the gesture image;
  determine whether a disaster related to a traveling area of the autonomous driving vehicle has occurred; and
  cause the autonomous driving vehicle to stop around the person requesting the autonomous driving vehicle to stop, when a ratio of the discrimination results that the gesture of the person around the autonomous driving vehicle is the gesture requesting the autonomous driving vehicle to stop is greater than a predetermined threshold, and it is determined that the disaster has occurred.

* * * * *